United States Patent
Fujiwara

(10) Patent No.: US 8,450,005 B2
(45) Date of Patent: May 28, 2013

(54) MOLTEN SALT AND THERMAL BATTERY

(75) Inventor: Syozo Fujiwara, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/523,619

(22) Filed: Jun. 14, 2012

(65) Prior Publication Data
US 2012/0276433 A1    Nov. 1, 2012

Related U.S. Application Data

(62) Division of application No. 12/126,292, filed on May 23, 2008, now Pat. No. 8,221,912.

(30) Foreign Application Priority Data

May 25, 2007   (JP) ................................ 2007-138952
May 20, 2008   (JP) ................................ 2008-131945

(51) Int. Cl.
*H01M 6/36*    (2006.01)
(52) U.S. Cl.
USPC ............................ 429/103; 429/101; 429/102
(58) Field of Classification Search
None
See application file for complete search history.

(56) References Cited

U.S. PATENT DOCUMENTS

| | | |
|---|---|---|
| 3,470,027 A | 9/1969 | Nielsen |
| 3,488,221 A | 1/1970 | Hiroshi et al. |
| 3,770,506 A | 11/1973 | Rightmire et al. |
| 3,827,910 A | 8/1974 | Cairns et al. |
| 3,898,096 A | 8/1975 | Heredy et al. |
| 3,907,590 A | 9/1975 | Saunders |
| 4,057,678 A | 11/1977 | Walker, Jr. |
| 4,060,667 A | 11/1977 | Askew et al. |
| 4,189,827 A * | 2/1980 | Eberhart et al. ............. 29/623.1 |
| 4,849,309 A | 7/1989 | Redey et al. |
| 2003/0211383 A1 * | 11/2003 | Munshi et al. ................ 429/112 |

FOREIGN PATENT DOCUMENTS

| | | |
|---|---|---|
| JP | 02-061962 | 3/1990 |
| JP | 5-054894  | 3/1993 |
| JP | 08-106912 | 4/1996 |
| JP | 10-172581 | 6/1998 |

OTHER PUBLICATIONS

National Materials Advisory Board, "Assessment of Research Needs for Advanced Battery Systems," National Academy Press, Publication NMAB-390, 1982, pp. 109-117.
United States Office Action issued in U.S. Appl. No. 11/593,511, mailed Nov. 6, 2009.
United States Office Action issued in U.S. Appl. No. 11/593,511, mailed May 6, 2010.
United States Office Action issued in U.S. Appl. No. 11/593,511, mailed Nov. 9, 2010.
Masset, P., et al., "LiF-LiCl-LiI vs. LiF-LiBr-KBr as Molten Salt Electrolyte in Thermal Batteries", Journal of the Electrochemical Society, 2005, pp. A405-A410, vol. 152 No. 2, The Electrochemical Society, Inc.

* cited by examiner

*Primary Examiner* — Ula C Ruddock
*Assistant Examiner* — Tony Chuo
(74) *Attorney, Agent, or Firm* — McDermott Will & Emery LLP

(57) ABSTRACT

The present invention provides a molten salt containing at least two salts, and having a melting point of 350° C. or more and 430° C. or less and an electric conductivity at 500° C. of 2.2 S/cm or more. The present invention also provides a thermal battery including the molten salt as an electrolyte.

7 Claims, 2 Drawing Sheets

F I G. 1
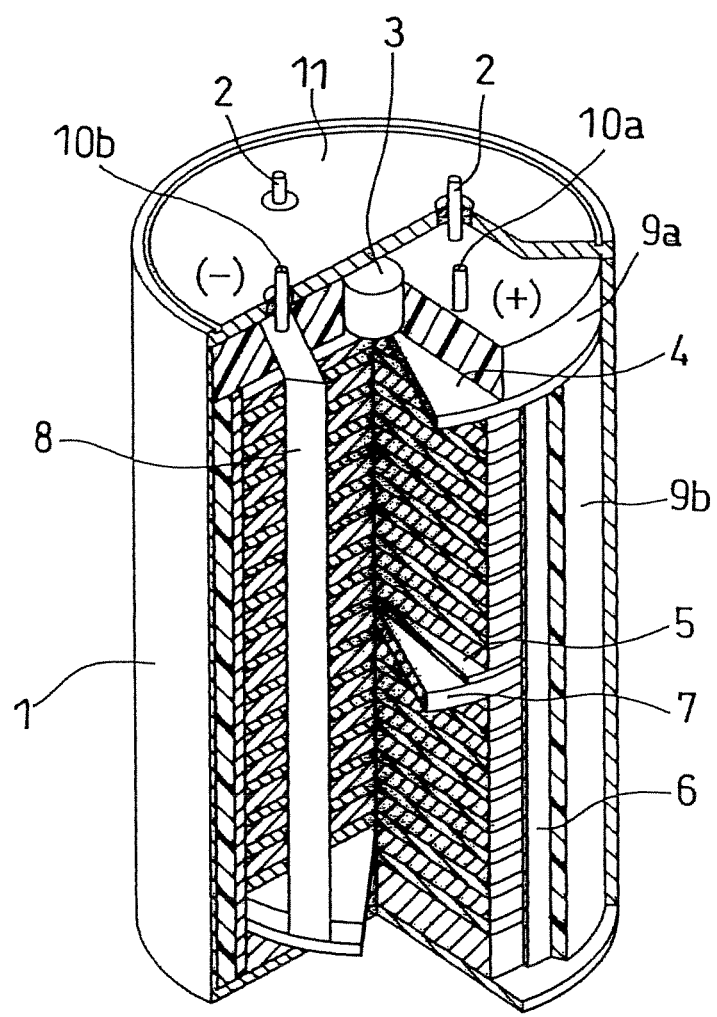

US 8,450,005 B2

MOLTEN SALT AND THERMAL BATTERY

RELATED APPLICATIONS

This application is a Divisional of U.S. application Ser. No. 12/126,292, filed on May 23, 2008 now issued as U.S. Pat. No. 8,221,912, claiming priority of Japanese Patent Application Nos. 2007-138952, filed May 25, 2007 and 2008-131945, filed on May 20, 2008, the entire contents of each of which are hereby incorporated by reference.

FIELD OF THE INVENTION

The present invention relates to a molten salt and a thermal battery including the molten salt, particularly to an improvement of the molten salt.

BACKGROUND OF THE INVENTION

Generally, a molten salt includes at least one salt, and is used in a molten state. In recent days, salts that are in the molten state (that is, liquid state) even under a normal temperature have been proposed, and they are called a normal temperature molten salt, an ionic liquid, and so on.

Molten salts are used, for example, as an electrolyte used in industrial electrolysis or metal refining, and also used in manufacture of metal plutonium in atomic energy systems. Particularly, since a large amount of electric current flow is necessary in industrial electrolysis or metal refining, the molten salt used as an electrolyte is required to have high ion conductivity.

Molten salts are also used as an electrolyte of thermal batteries. Thermal batteries generally include a plurality of unit cells each of which having a negative electrode, a positive electrode, and an electrolyte disposed therebetween. For the electrolyte of such batteries, a salt that melts at high temperature (i.e., molten salt) is used. At normal temperature, electrolytes of molten salts have no ion conductivity and therefore thermal batteries are inactive. However, when the electrolyte is heated to high temperature, the electrolyte achieves a molten state, becoming an excellent ion-conductor. Thus, thermal batteries become active under high temperature and can supply electricity to the outside.

Thermal batteries are a type of storage battery, and normally the battery reaction does not advance unless the electrolyte melts. Thus, even after storage period of 5 to 10 years or more, thermal batteries can bring out the same level of battery performance as fresh batteries. Also, in thermal batteries, electrochemical reactions advance under high temperature. Therefore, compared with batteries using aqueous electrolytes or organic electrolytes, the electrochemical reaction advances far more rapidly. Thermal batteries thus have excellent large current discharge performance. Furthermore, in thermal batteries, electric power will be readily available in a short period of time, i.e., within a second, when an activation signal is sent to the battery upon use, though the period varies depending on the heating means (heating element). Therefore, thermal batteries are suitably used for a power source of various ordnance devices such as guidance systems, an emergency power source, and so on.

Meanwhile, in these days, devices with thermal batteries mounted therein are achieving increasingly high performance, and therefore power consumption of these devices is also increasing. Thus, thermal batteries are required to achieve even higher output. For achieving an output of about the same level as in conventional thermal batteries, by using the techniques for achieving high output, the batteries can be made small and lightweight compared with those batteries made by conventional techniques. Therefore, if high output can be achieved, by using the techniques for achieving high output, demands for small and lightweight batteries can be met.

Various examinations have been conducted on electrolytes so far for achieving high output thermal batteries. For example, Patent Document 1 has proposed that a LiF—LiCl—LiBr molten salt is used as an electrolyte. Patent Document 2 has proposed that a LiCl—LiBr—KBr molten salt is used as an electrolyte. Non-patent Document 1 has proposed that a molten salt containing iodine salt such as LiF—LiCl—LiI is used as an electrolyte.

Patent Document 1: Japanese Laid-Open Patent Publication No. Hei 2-61962

Patent Document 2: Japanese Laid-Open Patent Publication No. Hei 10-172581

Non-Patent Document 1: P. Masset, Journal of Electrochemical Society, 152(2), A 405-A 410 (2005)

To achieve high output, ion conductivity (conductivity) of the molten salt has to be high. Meanwhile, in terms of practical use, the melting point of the molten salt has to be also considered. Even with high ion conductivity, when the molten salt has a higher melting point than the melting point of the currently used molten salt, a special material has to be used for a heating element disposed in the battery. Furthermore, the operation temperature range of the thermal battery is also limited. That is, a molten salt with a high melting point has significant demerits.

For example, among the molten salts that have been proposed so far, the molten salt with the highest ion conductivity is probably the LiF—LiCl—LiBr molten salt disclosed in Patent Document 1 above. However, the melting point of this molten salt is 443° C., which is 90° C. or more higher than the melting point of a widely used LiCl—KCl molten salt (melting point 350° C.). Thus, when the LiF—LiCl—LiBr molten salt is used as an electrolyte, the internal temperature setting of the thermal battery has to be made far higher than the conventional setting of about 500° C. When for example $FeS_2$, which starts thermal decomposition at about 600° C., is used as a positive electrode material and the internal temperature setting of the thermal battery is set far more higher than 500° C., there may be a possibility of positive electrode material deterioration.

Furthermore, in many cases, thermal batteries are required to be dischargeable even in an environment of −50° C. In such a low temperature environment, the temperature is about 70° C. lower than the normal temperature (about 20° C.) Therefore, when the operating temperature of thermal batteries under a normal temperature environment is set to 500° C., i.e., a general operating temperature of thermal batteries, in an environment of low temperature such as −50° C., the internal temperature of the thermal battery will probably be about 430° C. Since the melting point of the LiF—LiCl—LiBr molten salt disclosed in Patent Document 1 is about 440° C., when the internal temperature of the thermal battery decreases to about 430° C., the temperature of the molten salt also reaches the range of the freezing point. As a result, the thermal battery containing the molten salt disclosed in Patent Document 1 can only provide a very small discharge capacity, or becomes unable to discharge.

As described above, when the molten salt disclosed in Patent Document 1 is used, and the operating temperature of the thermal battery is set high, it gives severe effects on the positive electrode and so on. Additionally, when a thermal battery containing the molten salt disclosed in Patent Document 1 is used in a low temperature environment, discharge performance and so on will be affected.

The melting point of the LiCl—LiBr—KBr molten salt disclosed in Patent Document 2 is about the same as the melting point of the LiCl—KCl molten salt. However, the ion conductivity of the LiCl—LiBr—KBr molten salt is low compared with the ion conductivity of the LiCl—KCl molten salt. Therefore, even if the molten salt disclosed in Patent Document 2 is used, output performance of thermal batteries cannot be improved.

Non-patent Document 1 discloses a molten salt containing iodine salt such as LiF—LiCl—LiI. The molten salt containing iodine salt has a melting point of about 400° C. and a relatively high ion conductivity depending on the iodine salt content. The molten salt disclosed in Non-patent Document 1 contains a relatively high concentration of iodine salt. However, as described later, iodine has a far higher reactivity with moisture or oxygen compared with other salts. Therefore, when the molten salt disclosed in Non-patent Document 1 is used as an electrolyte of a thermal battery, further improvement in terms of practical use is necessary.

BRIEF SUMMARY OF THE INVENTION

Thus, it is an object of the present invention to provide a molten salt that is high in ion conductivity and can be used under practical temperature. Another object of the present invention is to provide a molten salt with improved chemical stability. Still another object of the present invention is to provide a thermal battery that is dischargeable even in a low temperature environment and has high output, or a small and lightweight thermal battery.

A molten salt of the present invention includes at least a first salt and a second salt, and has a melting point of 350° C. or more and 430° C. or less and an electric conductivity at 500° C. of 2.2 S/cm or more.

Each of the first salt and the second salt preferably includes an inorganic cation and an inorganic anion. The inorganic cation is preferably at least one selected from the group consisting of lithium cation, sodium cation, potassium cation, rubidium cation, and cesium cation. The inorganic anion is preferably at least one selected from the group consisting of fluorine anion, chlorine anion, bromine anion, iodine anion, nitrate ion, and carbonate ion.

In a preferred embodiment of the present invention, the first salt includes LiF, LiCl, and LiBr, and the second salt includes at least one salt selected from the group consisting of NaF, NaCl, NaBr, KF, KCl, KBr, RbF, RbCl, RbBr, CsF, CsCl, and CsBr.

In another preferred embodiment of the present invention, the first salt includes two salts selected from the group consisting of LiF, LiCl, and LiBr, and the second salt includes at least one salt selected from the group consisting of NaF, NaCl, NaBr, KF, KCl, KBr, RbF, RbCl, RbBr, CsF, CsCl, and CsBr.

When the first salt includes LiF and LiCl, the second salt preferably includes at least one salt selected from the group consisting of NaF, NaCl, NaBr, KF, KCl, KBr, and RbCl.

When the first salt includes LiF and LiBr, the second salt preferably includes at least one salt selected from the group consisting of NaF, NaCl, NaBr, KF, KCl, RbF, and CsF.

When the first salt includes LiCl and LiBr, the second salt preferably includes at least one salt selected from the group consisting of NaF, NaCl, NaBr, KF, KCl, RbF, and CsF.

In still another preferred embodiment of the present invention, the first salt includes at least one salt selected from the group consisting of LiF, LiCl, and LiBr, and the second salt includes at least one salt selected from the group consisting of NaF, NaCl, NaBr, KF, KCl, KBr, RbF, RbCl, RbBr, CsF, CsCl, and CsBr.

When the first salt includes LiCl, the second salt preferably includes at least one salt selected from the group consisting of NaF, NaCl, NaBr, KF, KCl, KBr, RbF, and CsF.

When the first salt includes LiBr, the second salt preferably includes at least one salt selected from the group consisting of NaF, NaCl, NaBr, KF, KCl, and CsF.

In still another preferred embodiment of the present invention, the first salt includes LiF, LiCl, and LiBr, and the second salt includes at least one salt selected from the group consisting of NaF, NaCl, NaBr, NaI, KF, KCl, KBr, KI, RbF, RbCl, RbBr, RbI, CsF, CsCl, CsBr, CsI, and LiI, and the second salt includes at least LiI.

In still another preferred embodiment of the present invention, the first salt includes LiI and two salts selected from the group consisting of LiF, LiCl, and LiBr, and the second salt includes at least one salt selected from the group consisting of NaF, NaCl, NaBr, NaI, KF, KCl, KBr, KI, RbF, RbCl, RbBr, RbI, CsF, CsCl, CsBr, and CsI.

In this embodiment, when the first salt includes LiF, LiCl, and LiI, the second salt preferably includes at least a Na-containing salt. The Na-containing salt preferably includes NaBr.

In this embodiment, when the first salt includes LiF, LiBr, and LiI, the second salt preferably includes at least a Na-containing salt. The Na-containing salt preferably includes at least one salt selected from the group consisting of NaF, NaCl, and NaBr.

In this embodiment, when the first salt includes LiCl, LiBr, and LiI, the second salt preferably includes at least one salt selected from the group consisting of a Na-containing salt and a K-containing salt. The Na-containing salt preferably includes at least one salt selected from the group consisting of NaF and NaBr. The K-containing salt preferably includes KF.

In still another preferred embodiment of the present invention, the first salt includes LiI and one salt selected from the group consisting of LiF, LiCl, and LiBr, and the second salt includes at least one salt selected from the group consisting of NaF, NaCl, NaBr, NaI, KF, KCl, KBr, KI, RbF, RbCl, RbBr, RbI, CsF, CsCl, CsBr, and CsI.

In this embodiment, when the first salt includes LiBr and LiI, the second salt preferably includes at least a Cs-containing salt. The Cs-containing salt preferably includes CsF.

In still another preferred embodiment of the present invention, the first salt includes at least one salt selected from the group consisting of LiF, LiCl, LiBr, and LiI; the second salt includes at least one salt selected from the group consisting of NaF, NaCl, NaBr, NaI, KF, KCl, KBr, KI, RbF, RbCl, RbBr, RbI, CsF, CsCl, CsBr, and CsI; and at least one of the first salt and the second salt includes at least one I-containing salt.

In this embodiment, when the first salt includes LiBr, the second salt preferably includes at least a Na-containing salt. The Na-containing salt preferably includes NaCl. The I-containing salt preferably includes KI.

The amount of lithium cation relative to the total amount of cation included in the molten salt is preferably 50 mol % or more.

The amount of fluorine anion relative to the total amount of anion included in the molten salt is preferably 20 mol % or less.

The amount of iodine anion relative to the total amount of anion included in the molten salt is preferably 20 mol % or less.

The present invention also relates to a thermal battery including at least one unit cell including a positive electrode, a negative electrode, and an electrolyte being disposed between the positive electrode and the negative electrode and including the molten salt. In the thermal battery, at least one of the positive electrode and the negative electrode preferably further includes the molten salt.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a perspective view of a thermal battery in one embodiment of the present invention, with a partially cutaway cross-sectional view.

DETAILED DESCRIPTION OF THE INVENTION

Figure 2:
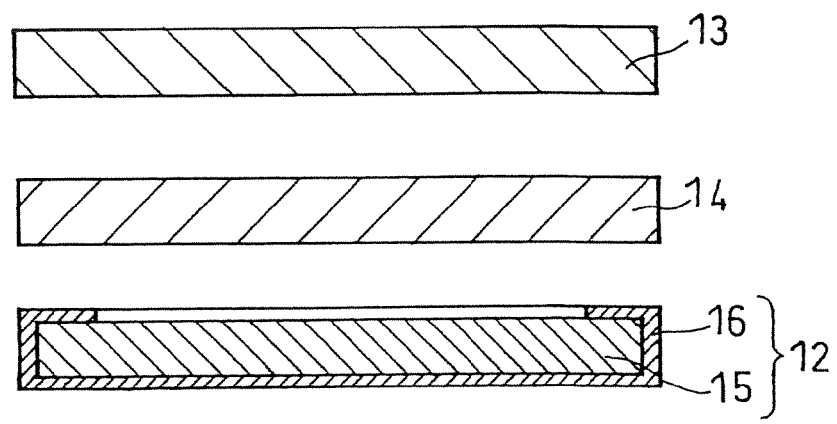
FIG. 2 is a vertical cross-sectional view of a unit cell used in a thermal battery in one embodiment of the present invention.

A molten salt of the present invention includes at least a first salt and a second salt, has a melting point of 350° C. or more and 430° C. or less, and has an electric conductivity at 500° C. of 2.2 S/cm or more. Further, a thermal battery of the present invention includes the above-described molten salt as an electrolyte. To be specific, the thermal battery of the present invention includes at least one unit cell including a positive electrode, a negative electrode, and an electrolyte being disposed therebetween and containing a salt (the above-described molten salt) that melts at the operating temperature of the thermal battery. The operating temperature of the thermal battery is higher than the melting point of the molten salt contained in the electrolyte.

The molten salt of the present invention is especially suitable for electrolytes of thermal batteries. As described above, the molten salt of the present invention has an electric conductivity at 500° C. of 2.2 S/cm or more, which is higher than that of the LiCl—KCl molten salt (electric conductivity at 500° C. of 1.87 S/cm) generally used as an electrolyte of thermal batteries. Therefore, by using the molten salt of the present invention as an electrolyte of the thermal battery, a thermal battery with excellent output performance can be provided.

The molten salt of the present invention has a melting point of 350 to 430° C., which is the same level as or a little higher than the melting point (350° C.) of the LiCl—KCl molten salt. Therefore, when using the molten salt of the present invention, a heating element (heating agent) conventionally used in thermal batteries may be used. That is, by using the molten salt of the present invention, the same kind of the heating agent can be used in the same amount as used conventionally.

Furthermore, by using the molten salt of the present invention, output performance of thermal batteries can be improved without drastically changing other battery constituents. Therefore, when the conventional level of output performance in the thermal battery is satisfactory, the constituents other than the electrolyte can be decreased to a certain degree. That is, use of the molten salt of the present invention as an electrolyte of thermal batteries can also provide a small and lightweight thermal battery.

Furthermore, since the molten salt of the present invention has a high electric conductivity, other than the electrolyte for thermal batteries, it can be used as an electrolyte for industrial electrolysis or metal refining. The molten salt of the present invention can also be used for large batteries such as power-storage systems and power-generating systems using molten salts as an electrolyte. Further, the molten salt of the present invention can also be used for resource recycling such as collecting metals from wastes, and for providing a reaction field for composing a new material.

The molten salt of the present invention includes at least a first salt and a second salt in view of controlling the melting point and the electric conductivity. That is, the molten salt of the present invention includes a salt mixture. The melting point and the electric conductivity of the molten salt of the present invention can be controlled, for example, by appropriately changing the kind and the molar ratio of the salts to be added. Even in the case where the molten salt includes a mixture of a plurality of salts of, for example, binary, ternary, quaternary, and quinary salts, when the mixture has the above-mentioned melting point and electric conductivity, similar effects can be obtained.

Each of the first salt and the second salt included in the molten salt of the present invention preferably includes an inorganic cation and an inorganic anion. The inorganic cation preferably includes at least one selected from the group consisting of lithium cation, sodium cation, potassium cation, rubidium cation, and cesium cation. The inorganic anion preferably includes at least one selected from the group consisting of fluorine anion, chlorine anion, bromine anion, iodine anion, nitrate anion, and carbonate anion.

In at least two salts of the molten salt of the present invention, preferably, at least one salt includes lithium cation, and the other salt includes at least one selected from the group consisting of sodium cation, potassium cation, rubidium cation, and cesium cation.

The composition of the molten salt of the present invention is not particularly limited, as long as the above-mentioned melting point and electric conductivity can be obtained. For example, the composition of the molten salt of the present invention may be a composition that allows a eutectic mixture, since the effects of the melting point drop are the most significant.

Note that the molten salt used for the electrolyte has to have sufficient ion conductivity in order to improve output performance. Therefore, the molten salt has to include a certain amount of a type of ion that contributes to charge and discharge. For example, in a thermal battery using lithium ion as the ion contributing to charge and discharge reaction, the amount of lithium ion relative to the total amount of cation contained in the molten salt is preferably 50 mol % or more. The amount of lithium ion is further preferably 80 mol % or more.

Depending on kinds and amounts of elements forming the molten salt or atom groups forming the functional group contained in the molten salt, there is a possibility that the molten salt becomes chemically unstable or affects a working environment.

For example, when the molten salt contains fluorine anion, even when the moisture in the working environment in which the molten salt is handled is managed and decreased, since fluorine inherently is highly reactive with moisture, there is a possibility that poisonous hydrogen fluoride is generated. Therefore, a molten salt containing fluorine anion may affect the surrounding environment during work, and may cause erosion of the parts inside the battery. To avoid such harmful effects, the amount of fluorine anion relative to the total amount of anion contained in the molten salt is preferably 20 mol % or less. The amount of fluorine anion is further preferably 18 mol % or less.

Furthermore, it has been known from examinations by the inventor that in addition to the high reactivity with moisture, iodine also reacts with oxygen. Therefore, when the molten salt contains iodine, reaction of iodine with moisture or oxygen in the working environment may change the composition of the molten salt. To avoid such harmful effects, the amount of iodine anion relative to the total amount of anion contained in the molten salt is preferably 20 mol % or less. The amount of iodine anion is further preferably 10 mol % or less.

Thus, by further limiting the amount of a predetermined type of ion contained in the molten salt, a further chemically stable and excellent performance molten salt can be obtained.

The amounts of lithium cation (or lithium atom), fluorine anion (or fluorine atom), and iodine anion (or iodine atom) included in the molten salt can be calculated from the molar ratio of salts contained in the molten salt.

The amounts of lithium cation (or lithium atom), fluorine anion (or fluorine atom), and iodine anion (or iodine atom) contained in the molten salt can also be measured, for example, by using fluorescent X-ray analysis in combination with other analysis method (for example, ICP emission spectrometry, atomic absorption spectrometry, ion chromatography, titrimetry, and so on). Based on these methods, the kind of salt contained in the molten salt and their compositional proportion can also be obtained.

The molten salt of the present invention is described in detail in the following.

Embodiment 1

In a preferred embodiment of the molten salt of the present invention, the first salt includes LiF, LiCl, and LiBr, and the second salt includes at least one salt selected from the group consisting of NaF, NaCl, NaBr, KF, KCl, KBr, RbF, RbCl, RbBr, CsF, CsCl, and CsBr.

Examples of a preferable salt combination include, LiF—LiCl—LiBr—NaF, LiF—LiCl—LiBr—NaF-KCl, LiF—LiCl—LiBr—NaCl, LiF—LiCl—LiBr—NaCl—KBr, LiF—LiCl—LiBr—NaBr, LiF—LiCl—LiBr—NaBr—KCl, LiF—LiCl—LiBr—KF, LiF—LiCl—LiBr—KF—NaF, LiF—LiCl—LiBr—KCl, LiF—LiCl—LiBr—KCl—KBr, and LiF—LiCl—LiBr—KBr. Among these, a molten salt with the second salt content of 30 mol % or less is particularly preferable.

Embodiment 2

In another preferred embodiment of the molten salt of the present invention, the first salt includes two salts selected from the group consisting of LiF, LiCl, and LiBr, and the second salt includes at least one salt selected from the group consisting of NaF, NaCl, NaBr, KF, KCl, KBr, RbF, RbCl, RbBr, CsF, CsCl, and CsBr.

In this embodiment, when the first salt includes LiF and LiCl, the second salt preferably includes at least one salt selected from the group consisting of NaF, NaCl, NaBr, KF, KCl, KBr, and RbCl. Particularly, the second salt further preferably includes at least one of NaBr and KF. In this case, a preferable salt combination includes, for example, LiF—LiCl—NaBr and LiF—LiCl—KF.

When the first salt includes LiF and LiBr, the second salt also preferably includes at least one salt selected from the group consisting of NaF, NaCl, NaBr, KF, KCl, RbF, and CsF. Particularly, the second salt further preferably includes a Na-containing salt such as NaF, NaCl, and NaBr. In this case, a preferable salt combination includes, for example, LiF—LiBr—NaF, LiF—LiBr—NaF—NaCl, LiF—LiBr—NaF-KCl, LiF—LiBr—NaCl, and LiF—LiBr—NaCl—KCl.

When the first salt includes LiCl and LiBr, the second salt preferably includes at least one salt selected from the group consisting of NaF, NaCl, NaBr, KF, KCl, RbF, and CsF. Particularly, the second salt further preferably includes at least one of the Na-containing salt and KF. As the Na-containing salt, NaF, NaCl, and NaBr can be used.

In this case, a preferable salt combination includes, for example, LiCl—LiBr—NaF, LiCl—LiBr—NaF—NaCl, LiCl—LiBr—NaCl—KF, LiCl—LiBr—NaBr, LiCl—LiBr—KF, and LiCl—LiBr—KF-KCl.

Embodiment 3

In still another preferred embodiment of the molten salt of the present invention, the first salt includes at least one salt selected from the group consisting of LiF, LiCl, and LiBr, and the second salt includes at least one salt selected from the group consisting of NaF, NaCl, NaBr, KF, KCl, KBr, RbF, RbCl, RbBr, CsF, CsCl, and CsBr.

In this embodiment, when the first salt includes LiCl, the second salt preferably includes at least one salt selected from the group consisting of NaF, NaCl, NaBr, KF, KCl, KBr, RbF, and CsF. In this case, a preferable salt combination includes, for example, LiCl—NaBr—KF and LiCl—NaBr—CsF.

When the first salt includes LiBr, the second salt preferably includes at least one salt selected from the group consisting of NaF, NaCl, NaBr, KF, KCl, and CsF. Particularly, the second salt further preferably includes KF. In this case, a preferable salt combination includes, for example, LiBr—KF—NaCl and LiBr—KF—NaBr.

Embodiment 4

In still another preferred embodiment of the molten salt of the present invention, the first salt includes LiF, LiCl, and LiBr, and the second salt includes at least one salt selected from the group consisting of NaF, NaCl, NaBr, NaI, KF, KCl, KBr, KI, RbF, RbCl, RbBr, RbI, CsF, CsCl, CsBr, CsI, and LiI, and the second salt includes at least LiI.

In this case, a preferable salt combination includes, for example, LiF—LiCl—LiBr—LiI.

Embodiment 5

In still another preferred embodiment of the molten salt of the present invention, the first salt includes LiI and two salts selected from the group consisting of LiF, LiCl, and LiBr, and the second salt includes at least one salt selected from the group consisting of NaF, NaCl, NaBr, NaI, KF, KCl, KBr, KI, RbF, RbCl, RbBr, RbI, CsF, CsCl, CsBr, and CsI.

In this embodiment, when the first salt includes LiF, LiCl, and LiI, the second salt preferably includes at least a Na-containing salt. The Na-containing salt is further preferably NaBr. In this case, a preferable salt combination includes, for example, LiF—LiCl—LiI—NaBr.

When the first salt includes LiF, LiBr, and LiI, the second salt preferably includes at least a Na—containing salt. The Na-containing salt is further preferably at least one salt selected from the group consisting of NaF, NaCl, and NaBr.

In this case, a preferable salt combination includes, for example, LiF—LiBr—LiI—NaF, LiF—LiBr—LiI—NaCl, and LiF—LiBr—LiI—NaBr.

When the first salt includes LiCl, LiBr, and LiI, the second salt preferably includes at least one salt selected from the group consisting of a Na-containing salt and a K-containing salt. The Na-containing salt is further preferably at least one salt selected from the group consisting of NaF and NaBr. The K-containing salt is further preferably KF.

In this case, a preferable salt combination includes, for example, LiCl—LiBr—LiI—NaF and LiCl—LiBr—LiI—KF.

Embodiment 6

In still another preferred embodiment of the molten salt of the present invention, the first salt includes LiI and one salt selected from the group consisting of LiF, LiCl, and LiBr, and the second salt includes at least one salt selected from the group consisting of NaF, NaCl, NaBr, NaI, KF, KCl, KBr, KI, RbF, RbCl, RbBr, RbI, CsF, CsCl, CsBr, and CsI.

In this embodiment, when the first salt includes LiBr and LiI, the second salt preferably includes at least a Cs-containing salt. The Cs-containing salt further preferably includes CsF.

In this case, a preferable salt combination includes, for example, LiBr—LiI—CsF.

Embodiment 7

In still another preferred embodiment of the molten salt of the present invention, the first salt includes one salt selected from the group consisting of LiF, LiCl, LiBr, and LiI; the second salt includes at least one salt selected from the group consisting of NaF, NaCl, NaBr, NaI, KF, KCl, KBr, KI, RbF, RbCl, RbBr, RbI, CsF, CsCl, CsBr, and CsI; and at least one of the first salt and the second salt includes one type of I-containing salt. The I-containing salt preferably includes KI.

In this embodiment, when the first salt includes LiBr, the second salt preferably includes at least the Na—containing salt, and at least one of the first salt and the second salt preferably includes at least one type of I-containing salt. The Na-containing salt further preferably includes NaCl. In this case as well, the I-containing salt preferably includes KI.

In this case, a preferable salt combination includes, for example, LiBr—KI—NaCl.

In the molten salts described in Embodiments 4 to 7, when the molten salt contains iodine anion, the iodine content relative to the total amount of anion is preferably 20 mol % or less, and particularly preferably 10 mol % or less.

In the following, an example of the thermal battery of the present invention is described with reference to FIG. 1.

A metal outer case 1 contains a power-generating portion, in which a plurality of unit cells 7 and a plurality of heating agents 5 are stacked in an alternating manner. At the uppermost portion of the power-generating portion, an ignition pad 4 is disposed, and in the proximity of the top of the ignition pad 4, an ignition plug 3 is disposed. A fuse wrap 6 is disposed around the power-generating portion. The heating agent 5 contains iron powder and has conductivity, and therefore the unit cells 7 are electrically connected in series with the heating agents 5 interposed therebetween. The heating agent 5 may be made of a mixture of, for example, Fe and $KClO_4$. Since the Fe powder is sintered along with the combustion of the heating agent 5 when the battery is activated, conductivity of the heating agent 5 is kept from the initial period of discharge (initial period of combustion) to the terminal period of discharge (terminal period of combustion).

The outer case 1 is sealed by a battery lid 11 including a pair of ignition terminals 2, a positive electrode terminal 10a, and a negative electrode terminal 10b. The positive electrode terminal 10a is connected to a positive electrode of the unit cell 7 at the uppermost portion of the power-generating portion via a positive electrode lead plate. On the other hand, the negative electrode terminal 10b is connected to a negative electrode of the unit cell 7 at the lowermost portion of the power-generating portion via a negative electrode lead plate 8. An insulating material 9a is disposed between the battery lid 11 and the ignition pad 4, and an insulating material 9b is disposed between the outer case 1 and the power-generating portion.

As shown in FIG. 2, the unit cell 7 includes a negative electrode 12, a positive electrode 13, and an electrolyte layer 14 disposed between the negative electrode 12 and the positive electrode 13.

As shown in FIG. 2, the negative electrode 12 includes a negative electrode material mixture layer 15 containing a negative electrode active material, and a cup-like metal case 16 housing the negative electrode material mixture layer 15. The negative electrode active material is not particularly limited, as long as it is a material that can be used for thermal batteries. For example, lithium metals, or lithium alloys such as Li—Al, Li—Si, and Li—B can be used for the negative electrode active material. For the material forming the metal case 16, for example, iron may be used.

The positive electrode 13 includes a positive electrode active material. The positive electrode active material is not particularly limited, as long as it is a material that can be used for thermal batteries. For the positive electrode active material, for example, manganese oxides such as $MnO_2$, vanadium oxides such as $V_2O_5$, sulfides such as $FeS_2$, molybdenum oxides, or lithium-containing oxides may be used.

The electrolyte layer 14 may include a mixture of, for example, the molten salt of the present invention and a carrier. The molten salt melts at the operating temperature of the thermal battery. For the carrier, for example, nonconductive inorganic materials such as MgO are used.

The operation of the above-described thermal battery is described in the following.

When a high-voltage is applied to the ignition terminals 2 from a power source connected to the ignition terminals 2, the ignition plug 3 is ignited. This allows combustion of the ignition pad 4 and the fuse wrap 6, and then the heating agents 5, thereby heating the unit cells 7. Then, the electrolyte layer 14 disposed in the unit cell 7 achieves molten state, and the electrolyte becomes an ion-conductor. The battery is activated in this manner and becomes dischargeable.

For better ion conductivity, at least one of the positive electrode 13 and the negative electrode material mixture layer 15 preferably includes at least one of the molten salts of the present invention. The molten salt contained in the positive electrode and/or the negative electrode material mixture layer may be the same as the molten salt used in the electrolyte layer 14. The molten salt contained in the positive electrode and/or the negative electrode material mixture layer may be different from the molten salt used in the electrolyte layer 14, as long as its melting point is about the same as that of the molten salt used in the electrolyte layer 14.

Note that the present invention can also be applied to an externally heated thermal battery, which is not provided with an ignition plug inside and is activated by heating the power-generating portion from outside by for example a burner, though the internally heated thermal battery including the ignition plug in the battery and is activated by applying heat internally to the power-generating portion is described in the above.

In the following, the present invention is described in detail based on examples. However, the present invention is not limited to these examples.

EXAMPLES

In examples below, the composition of the molten salt, the melting point of the molten salt, the conductivity of the molten salt, and output performance of the unit cell containing the molten salt as an electrolyte were determined as follows.

(1) Determination of Molten Salt Composition

For determination of the composition of the molten salt in detail, a method in which an equilibrium diagram is made based on computational science by using thermodynamic data, called CALPHAD (Calculation of Phase Diagram and Thermodynamics) method, is mainly used. The CALPHAD method is described in, for example, "Computer Calculation of Phase Diagrams with Special Reference to Refractory Metals" (Academic Press, New York, (1970)) written by L. Kaufman and H. Bernstein. In the CALPHAD method, although highly complicated calculation has to be carried out, for example, for determination of the equilibrium state, nowadays, software that operate on general computers, such as Thermo-Calc (Thermo-Calc Software AB) and FACT SAGE (GTT Technologies GmbH), are commercially available. FACT SAGE was used in these examples.

Based on this method, from thermodynamic data of individual salts forming the molten salt, the phase diagram at an arbitrary temperature can be made even for an unknown composition. Therefore, based on the phase diagram for a salt mixture made of two or more salts at various temperatures, the eutectic point of the salt mixture, i.e., the point at which the salt mixture changes its state from the molten state to a solidified state, can be obtained. That is, the melting point of the salt mixture and the eutectic composition at that point can be determined.

(2) Determination of Melting Point of Molten Salt

The melting point of the molten salt (salt mixture) was determined as follows.

In the first method, a phase diagram obtained by using the above-described CALPHAD method was used. To be specific, the melting point of the molten salt was determined by making phase diagrams at various temperatures, and checking the eutectic point and the composition from the obtained phase diagrams.

In the second method, the melting point of the molten salt was experimentally determined. The melting point of the molten salt can be determined, for example, by Differential Thermal Analysis (DTA) or Differential Scanning calorimetry (DSC). Here, the melting point of the molten salt was determined by using a Thermo gravimetry (TG)-Differential Thermal Analysis (DTA) apparatus, which can measure the weight change by thermal change and the heat absorption at a eutectic point.

(3) Electric Conductivity Measurement

The electrical conductivity (electric conductivity) of the molten salt was experimentally measured. The measurement of the electric conductivity was conducted by referring to the method introduced by for example Sato et al. of Tohoku University (for example, "Electric Conductivity and Density of Molten NaF—$AlF_3$ system" Yuzuru Sato et al. Journal of the Japan Institute of Metals vol. 41, No. 12 (1977)). To be specific, a conductivity-cell formed of a quartz body and a platinum electrode is made. A cell constant of the conductivity-cell is determined by carrying out an alternating current impedance method for an aqueous solution of KCl or a molten salt of LiCl—KCl, the conductivity values of which are already known. By using the conductivity-cell for which the cell constant was determined, the resistance value of the molten salt at an arbitrary temperature, for example, at 500° C., which is considered to be a standard internal temperature of thermal batteries, is measured. By using the obtained resistance value, the electric conductivity of a molten salt can be obtained. Based on this method, the electric conductivity of a molten salt at an arbitrary temperature can be measured accurately.

As described above, a phase diagram of a molten salt of an unknown composition can be obtained by the method described in (1), and based on the phase diagram, the eutectic point (melting point) of the molten salt, and the composition thereof at that point can be determined. Based on the method described in (2) (second method), the melting point of the molten salt can be measured experimentally. Furthermore, based on the method described in (3), the electric conductivity of the molten salt can be obtained.

(4) DC-IR Measurement on Unit Cell

Next, the output performance of a thermal battery containing a molten salt of the present invention as an electrolyte was evaluated. To be specific, the direct current inner resistance (DC-IR) at high rate discharge, which is a scale for output performance, was determined as follows.

A unit cell including a positive electrode, a negative electrode, and an electrolyte disposed therebetween was made. The obtained unit cell was sandwiched between two temperature-controllable plates, heated to a predetermined temperature, and a voltage without load, i.e., $V_{open}$, was determined.

Next, the unit cell was discharged at an electric current corresponding to, for example, $1.0 \, A \cdot cm^{-2}$. The current density $1.0 \, A \cdot cm^{-2}$ is a general current density at high rate discharge of thermal batteries.

When a unit cell is discharged, its voltage drops from the voltage without load, i.e., $V_{open}$. The voltage dropped is considered as the reaction resistance at that electric current, and called a direct current inner resistance (DC-IR). To be specific, based on Ohm's law, from the voltage without load, i.e., $V_{open}$, and the voltage during discharge at current value I (A), for example, discharge voltage $V_{1.0}$ when a unit cell with a diameter of 13 mm is discharged at a current value of 1.33 A, which corresponds to a current density of $1.0 \, A \cdot cm^{-2}$, DC-IR ($\Omega$) can be expressed as (Voltage Drop $\Delta V$)÷1.33=$(V_{open}-V_{1.0})$÷1.33.

The measurement of DC-IR was carried out at 500° C. and 430° C. A standard internal temperature of thermal batteries during operation in a normal temperature environment is 500° C. The temperature 430° C. is the assumed temperature of the internal temperature of a battery in an environment with a temperature of −50° C. The measurement of DC-IR at 430° C. was conducted for evaluating battery performance at low temperature, at which discharge reaction generally declines.

Example 1

A unit cell shown in FIG. 2 was made as in the following procedures. Preparation of all of the positive electrode, the electrolyte layer, the negative electrode, and the unit cell was basically carried out in dry air with a dew point of −50° C. or less to eliminate the effects from moisture as much as possible.

(1) Electrolyte Preparation

Lithium fluoride (LiF), lithium chloride (LiCl), lithium bromide (LiBr) were used as a first salt, and sodium fluoride (NaF) was used as a second salt. These salts were dried in a vacuum environment at 200° C. for 48 hours.

Afterwards, LiF, LiCl, LiBr, and NaF were mixed with a molar ratio of 7:23:60:10 in a glove box of an argon atmosphere in which the dew point was controlled. The obtained mixture was transferred to a crucible of high-purity alumina in an appropriate amount, and the crucible was placed in a melting furnace. Inside the melting furnace was an argon atmosphere with a controlled dew point. The mixture was heated and melted in the melting furnace, thereby obtaining a salt mixture of LiF, LiCl, LiBr, and NaF.

The obtained salt mixture was cooled naturally. Afterwards, the salt mixture was crushed under an atmosphere of argon with a controlled dew point by using a ball mill with stainless steel balls for about 12 hours, thereby allowing the mixture to be powder. The obtained salt mixture powder was classified with a sieve of 60 mesh (opening 250 μm).

The obtained salt mixture powder was mixed with magnesium oxide (MgO) with a weight ratio of 60:40. The obtained mixture was heated in a melting furnace at 500° C. for 12 hours, thereby sufficiently blending the salt mixture with MgO. The mixture was naturally cooled after the heating.

Then, the mixture was crushed by using a ball mill with stainless steel balls for about 12 hours under an atmosphere of argon with a controlled dew point. The obtained powder was classified with a sieve of 60 mesh (opening 250 μm). The obtained mixture powder was pressed with die at a pressure of 3 ton/cm$^2$, thereby obtaining a disk-like electrolyte layer with a diameter of 13 mm and a thickness of about 0.5 mm.

(2) Positive Electrode Preparation

FeS$_2$ powder (average particle size 12 μm) was used as a positive electrode active material. The positive electrode active material, the above-described salt mixture of LiF, LiCl, LiBr, and NaF, and silica powder (average particle size of about 0.2 μm) were mixed with a weight ratio of 70:20:10. The obtained mixture was pressed with die at a pressure of 3 ton/cm$^2$, thereby obtaining a disk-like positive electrode with a diameter of 13 mm and a thickness of about 0.4 mm.

(3) Negative Electrode Preparation

Li—Al alloy powder (lithium content: 20 wt %) was used as a negative electrode active material. The negative electrode active material and the above-described salt mixture of LiF, LiCl, LiBr, and NaF were mixed with a weight ratio of 65:35. The obtained mixture was pressed with die at a pressure of 3 ton/cm$^2$, thereby obtaining a disk-like negative electrode material mixture layer with a diameter of 11 mm and a thickness of about 0.4 mm.

Then, the negative electrode material mixture layer was placed in a cup-like metal case of stainless steel (SUS 304), and the opening end portion of the metal case was bent inwardly to crimp the peripheral portion of the negative electrode material mixture layer, thereby fixing the negative electrode material mixture layer in the metal case. A disk-like negative electrode with a diameter of 13 mm and a thickness of about 0.5 mm was thus obtained.

A unit cell as shown in FIG. 2 was obtained by using the positive electrode, the electrolyte layer, and the negative electrode thus obtained. The obtained unit cell was named a unit cell of Example 1.

Example 2

In the preparation of the electrolyte layer, LiF, LiCl, and LiBr were used as the first salt; NaCl was used as the second salt; and the molar ratio between LiF, LiCl, LiBr, and NaCl was set to 16:13:61:10. A unit cell of Example 2 was made in the same manner as Example 1 except for the above.

Example 3

In the preparation of the electrolyte layer, LiF, LiCl, and LiBr were used as the first salt; NaBr was used as the second salt; and the molar ratio between LiF, LiCl, LiBr, and NaBr was set to 16:21:53:10. A unit cell of Example 3 was made in the same manner as Example 1 except for the above.

Example 4

In the preparation of the electrolyte layer, LiF, LiCl, and LiBr were used as the first salt; KF was used as the second salt; and the molar ratio between LiF, LiCl, LiBr, and KF was set to 6:21:63:10. A unit cell of Example 4 was made in the same manner as Example 1 except for the above.

Example 5

In the preparation of the electrolyte layer, LiF, LiCl, and LiBr were used as the first salt; KCl was used as the second salt; and the molar ratio between LiF, LiCl, LiBr, and KCl was set to 15:12:63:10. A unit cell of Example 5 was made in the same manner as Example 1 except for the above.

Example 6

In the preparation of the electrolyte layer, LiF, LiCl, and LiBr were used as the first salt; KBr was used as the second salt; and the molar ratio between LiF, LiCl, LiBr, and KBr was set to 15:21:54:10. A unit cell of Example 6 was made in the same manner as Example 1 except for the above.

Comparative Example 1

In the preparation of the electrolyte layer, only LiCl and KCl were used, and the molar ratio of LiCl to KCl was set to 59:41. A unit cell of Comparative Example 1 was made in the same manner as Example 1 except for the above.

Comparative Example 2

A unit cell of Comparative Example 2 was made in the same manner as Example 1, except that LiF, LiCl, and LiBr were used, and the molar ratio between LiF, LiCl, and LiBr was set to 21:23:56 in the preparation of the electrolyte layer.

Comparative Example 3

In the preparation of the electrolyte layer, LiCl, LiBr, and KBr were used, and the molar ratio between LiCl, LiBr, and KBr was set to 25:37:38. A unit cell of Comparative Example 3 was made in the same manner as Example 1 except for the above.

Comparative Example 4

In the preparation of the electrolyte layer, LiF, LiBr, and KBr were used and the molar ratio between LiF, LiBr, and KBr was set to 3:60:37. A unit cell of Comparative Example 4 was made in the same manner as Example 1 except for the above.

Comparative Example 5

A unit cell of Comparative Example 5 was made in the same manner as Example 1, except that LiF, LiCl, and LiI were used and the molar ratio between LiF, LiCl, and LiI was set to 12:29:59 in the preparation of the electrolyte layer.

Table 1 shows the types and mixing ratios of the salts contained in the electrolyte layers of the unit cells. Table 2 shows the melting point of the molten salt, the electric conductivity at 500° C., and DC-IRs of the unit cell measured at 430° C. and 500° C. The DC-IRs at 430° C. and at 500° C. were values obtained during discharge at a current density of 1.0 A·cm$^{-2}$.

Table 2 shows the melting point of the molten salt obtained by TG-DTA analysis. As a result of making a comparison between a value obtained by TG-DTA analysis and a value obtained based on a phase diagram by the CALPHAD method regarding the melting point of a predetermined molten salt, it was found that differences between them were within several Celsius degrees at maximum. Therefore, it seems that the difference between a melting point obtained based on the phase diagram by the CALPHAD method, and a melting point obtained by the TG-DTA analysis is within several Celsius degrees.

The melting point or the freezing point obtained by experiments may possibly be affected by crystallization status of the measurement sample, calibration status of the measurement device, and so on. That is, there may be a possibility of measurement error when the melting point is obtained by experiments. In contrast, the melting point obtained by the CALPHAD method, which is based on sufficiently verified thermodynamic data, is not affected by the sample status, the measurement device, and so on. Therefore, the melting point obtained by calculation is considered sufficiently practical as long as due consideration is given to the measurement error.

For the melting point of the molten salts used in Example 7 and the following examples, the melting point obtained based on the phase diagram obtained by the CALPHAD method is mainly used.

TABLE 1

| | Types of Salts | Mixing Ratio of Salts (Molar Ratio) | Li-ion Prop. (mol %) | F-ion Prop. (mol %) | I-ion Prop. (mol %) |
|---|---|---|---|---|---|
| Ex. 1 | LiF + LiCl + LiBr + NaF | 7:23:60:10 | 90 | 17 | 0 |
| Ex. 2 | LiF + LiCl + LiBr + NaCl | 16:13:61:10 | 90 | 16 | 0 |
| Ex. 3 | LiF + LiCl + LiBr + NaBr | 16:21:53:10 | 90 | 16 | 0 |
| Ex. 4 | LiF + LiCl + LiBr + KF | 6:21:63:10 | 90 | 16 | 0 |
| Ex. 5 | LiF + LiCl + LiBr + KCl | 15:12:63:10 | 90 | 15 | 0 |
| Ex. 6 | LiF + LiCl + LiBr + KBr | 15:21:54:10 | 90 | 15 | 0 |
| Comp. Ex. 1 | LiCl + KCl | 59:41 | 59 | 0 | 0 |
| Comp. Ex. 2 | LiF + LiCl + LiBr | 21:23:56 | 100 | 21 | 0 |
| Comp. Ex. 3 | LiCl + LiBr + KBr | 25:37:38 | 62 | 0 | 0 |
| Comp. Ex. 4 | LiF + LiBr + KBr | 3:60:37 | 63 | 3 | 0 |
| Comp. Ex. 5 | LiF + LiCl + LiI | 12:29:59 | 100 | 12 | 59 |

TABLE 2

| | Melting Point (° C.) | Electric Conductivity at 500° C. (S/cm) | DC-IR at 500° C. (mΩ) | DC-IR at 430° C. (mΩ) |
|---|---|---|---|---|
| Ex. 1 | 425 | 3.4 | 69 | 79 |
| Ex. 2 | 425 | 3.5 | 67 | 78 |
| Ex. 3 | 425 | 3.5 | 66 | 78 |
| Ex. 4 | 425 | 3.3 | 72 | 83 |
| Ex. 5 | 425 | 3.3 | 71 | 82 |
| Ex. 6 | 430 | 3.3 | 72 | 83 |
| Comp. Ex. 1 | 350 | 1.9 | 108 | 118 |
| Comp. Ex. 2 | 438 | 3.3 | 83 | 199 |
| Comp. Ex. 3 | 326 | 1.6 | 118 | 131 |
| Comp. Ex. 4 | 325 | 1.6 | 116 | 129 |
| Comp. Ex. 5 | 341 | 2.9 | 82 | 93 |

Table 2 shows that DC-IR of the unit cells of Examples 1 to 6 at 500° C. was 66 to 72 mΩ. Such DC-IR values show a decline of about 33 to 39% compared with the DC-IR (108 mΩ) of a general thermal battery using a LiCl—KCl molten salt as an electrolyte. Therefore, use of the molten salt of the present invention decreases DC-IR. That is, for the same high rate discharge, the voltage drop can be kept lower in a thermal battery including the molten salt of the present invention. Thus, the output performance of thermal batteries can be improved.

The DC-IR of the unit cells of the Examples 1 to 6 at 430° C. was 78 to 83 mΩ. Such DC-IR values show a decline of about 30 to 34% compared with the DC-IR (118 mΩ) at 430° C. of a general thermal battery using a LiCl—KCl molten salt as an electrolyte. This is because of a high electric conductivity of the molten salts of these examples, which improved the ion conductivity and because of the melting point of 430° C. or less, which kept the high ion conductivity without becoming solid even at 430° C.

The unit cell of Comparative Example 2 was excellent in discharge performance at 500° C. However, the DC-IR value at 430° C. was very high compared with the case where a common LiCl—KCl molten salt was used as the electrolyte. The melting point of the molten salt used in Comparative Example 2 was 438° C., and at 430° C., the molten salt was substantially in a solidified state. Therefore, the ion conductivity dropped extremely, which probably made the thermal battery of Comparative Example 2 difficult or impossible to discharge. When a unit cell containing a predetermined molten salt as the electrolyte has a DC-IR so high that a discharge at 430° C. is difficult or impossible, a thermal battery containing such a unit cell cannot be used in a low temperature environment.

The following chemical stability problems have also been revealed, depending on the composition of the salts constituting the molten salt. When a molten salt is used as an electrolyte of thermal batteries, a nonconductive inorganic material such as MgO is used as a carrier. An electrolyte layer is generally made as follows. First, molten salt powder and MgO powder are mixed at normal temperature. Then, the obtained mixture is heated to a temperature equal to or higher than the melting point of the molten salt, and that temperature is kept for a certain period of time, so that the molten salt is homogenously and sufficiently adsorbed to the carrier.

As a result of experimentation on molten salts of various compositions, it was confirmed that in this adsorption process, some kind of decomposition reaction was taking place when iodine anion is present in the molten salt.

For example, it was found that when the melting point of the molten salt containing iodine anion is measured, the measurement result is affected by the measurement atmosphere. To be specific, when only the molten salt used in Comparative Example 5 was heated to 500° C. in a dry air atmosphere with a moisture controlled to be −40° C. or less, as a result of TG (Thermo Gravimetry) analysis, a weight loss of about 30% was observed. On the other hand, when the same molten salt was heated to 500° C. in an inert gas of highly pure Ar, the weight loss was a few percent or less. Therefore, from various experimental verifications, when a molten salt includes iodine anion, the molten salt probably causes decomposition reaction especially under the presence of oxygen.

That is, iodine anion reacts with oxygen gas in the atmosphere to produce $I_3^-$ (formula (A)). The produced $I_3^-$ achieves an equilibrium state with an iodine molecule, and monovalent iodine anion (formula (B)). That is, a possible mechanism is that from the effects of a minute amount of oxygen in the environment, the iodine anion included in the molten salt frees from the molten salt as iodine molecules.

To avoid such reactions, in addition to the moisture amount control in the working atmosphere or the atmosphere inside the battery that has been done conventionally, oxygen gas has to be eliminated as much as possible from the atmosphere. However, as a result of various investigations, it has become clear that there is no practical problem as long as the amount of iodine anion contained in the molten salt is 20 mol % or less. In view of such, the molten salt used in Comparative Example 5 probably has a problem of chemical stability, since it has 59 mol % of iodine anion.

Additionally, as described above, fluorine is highly reactive with water. Thus, when the molten salt includes fluorine anion, even if the moisture in the working environment is controlled and decreased, there may be a possibility that the molten salt may affect the working environment, and the parts in the battery may be corroded. To avoid such harmful effects, the amount of fluorine anion included in the molten salt is preferably 20 mol % or less. In view of such, the molten salt used in Comparative Example 2 probably has problem in chemical stability since it contains 21 mol % or more of fluorine anion.

As described above, in the unit cells of Comparative Examples 3 and 4, compared with the unit cell of Comparative Example 1, which has a conventional standard composition, the effects of improving output performance could not be confirmed.

In the unit cell of Comparative Example 2, although the output performance at 500° C. improved, the output performance at 430° C. did not improve, and was lower than the output performance of the unit cell of Comparative Example 1 at 430° C. Furthermore, it was found that the molten salt used in Comparative Example 2 had a problem in chemical stability as described above.

Although the effects of the improvement in output performance was confirmed in the unit cell of Comparative Example 5, the molten salt used in Comparative Example 5 had a problem in chemical stability as described above.

In contrast, the electric conductivity at 500° C. of the molten salt of the present invention is 2.2 S/cm or more, which is higher than the electric conductivity at 500° C. of the conventionally and commonly used LiCl—KCl molten salt. Therefore, the unit cells of Examples 1 to 6 containing the molten salt of the present invention as the electrolyte had low DC-IR due to their improved ion conductivity. Therefore, by using the molten salt of the present invention, the output performance of thermal batteries can be improved.

Furthermore, the melting point of the molten salt of the present invention is 350° C. or more and 430° C. or less. Thus, the molten salt of the present invention can keep the molten state even under a temperature range (about 430° C. or less) lower than the temperature range at which the conventional molten salt could not keep its molten state.

That is, a thermal battery containing the molten salt of the present invention can discharge even under a temperature range in which a thermal battery containing a conventional molten salt could not discharge.

As described above, the molten salt of the present invention has important properties (melting point and electric conductivity) for use as the electrolyte of thermal batteries. Furthermore, the molten salt of the present invention has chemical stability as well. Therefore, in addition to achieving an improved output performance of thermal batteries in a further wider temperature range, using the molten salt of the present invention can decrease environmental load, and improve long-term shelf life.

In the following, Examples of other salt combinations that achieve the molten salt of the present invention are shown.

Example 7

In the preparation of the electrolyte layer, LiF, LiCl, and LiBr were used as the first salt; RbF was used as the second salt; and the molar ratio between LiF, LiCl, LiBr, and RbF was set to 5:18:67:10. A unit cell of Example 7 was made in the same manner as Example 1 except for the above.

Example 8

In the preparation of the electrolyte layer, LiF, LiCl, and LiBr were used as the first salt; RbCl was used as the second salt; and the molar ratio between LiF, LiCl, LiBr, and RbCl was set to 14:13:63:10. A unit cell of Example 8 was made in the same manner as Example 1 except for the above.

Example 9

In the preparation of the electrolyte layer, LiF, LiCl, and LiBr were used as the first salt; RbBr was used as the second salt; and the molar ratio between LiF, LiCl, LiBr, and RbBr was set to 14:18:58:10. A unit cell of Example 9 was made in the same manner as Example 1 except for the above.

Example 10

In the preparation of the electrolyte layer, LiF, LiCl, and LiBr were used as the first salt; CsF was used as the second salt; and the molar ratio between LiF, LiCl, LiBr, and CsF was set to 5:20:65:10. A unit cell of Example 10 was made in the same manner as Example 1 except for the above.

Example 11

In the preparation of the electrolyte layer, LiF, LiCl, and LiBr were used as the first salt; CsCl was used as the second salt; and the molar ratio between LiF, LiCl, LiBr, and CsCl was set to 13:15:62:10. A unit cell of Example 11 was made in the same manner as Example 1 except for the above.

Example 12

In the preparation of the electrolyte layer, LiF, LiCl, and LiBr were used as the first salt; CsBr was used as the second salt; and the molar ratio between LiF, LiCl, LiBr, and CsBr was set to 13:21:56:10. A unit cell of Example 12 was made in the same manner as Example 1 except for the above.

Example 13

In the preparation of the electrolyte layer, LiF, LiCl, and LiBr were used as the first salt; NaCl was used as the second salt; and the molar ratio between LiF, LiCl, LiBr, and NaCl was set to 1:14:35:50. A unit cell of Example 13 was made in the same manner as Example 1 except for the above.

Example 14

In the preparation of the electrolyte layer, LiF, LiCl, and LiBr were used as the first salt; NaBr was used as the second salt; and the molar ratio between LiF, LiCl, LiBr, and NaBr was set to 1:40:9:50. A unit cell of Example 14 was made in the same manner as Example 1 except for the above.

Example 15

In the preparation of the electrolyte layer, LiF, LiCl, and LiBr were used as the first salt; KCl was used as the second salt; and the molar ratio between LiF, LiCl, LiBr, and KCl was set to 2:3:45:50. A unit cell of Example 15 was made in the same manner as Example 1 except for the above.

Example 16

In the preparation of the electrolyte layer, LiF, LiCl, and LiBr were used as the first salt; KBr was used as the second salt; and the molar ratio between LiF, LiCl, LiBr, and KBr was set to 2:13:35:50. A unit cell of Example 16 was made in the same manner as Example 1 except for the above.

Example 17

In the preparation of the electrolyte layer, LiF, LiCl, and LiBr were used as the first salt; NaCl was used as the second salt; and the molar ratio between LiF, LiCl, LiBr, and NaCl was set to 8:14:48:30. A unit cell of Example 17 was made in the same manner as Example 1 except for the above.

Example 18

In the preparation of the electrolyte layer, LiF, LiCl, and LiBr were used as the first salt; NaBr was used as the second salt; and the molar ratio between LiF, LiCl, LiBr, and NaBr was set to 8:35:27:30. A unit cell of Example 18 was made in the same manner as Example 1 except for the above.

Example 19

In the preparation of the electrolyte layer, LiF, LiCl, and LiBr were used as the first salt; KCl was used as the second salt; and the molar ratio between LiF, LiCl, LiBr, and KCl was set to 6:7:57:30. A unit cell of Example 19 was made in the same manner as Example 1 except for the above.

Example 20

In the preparation of the electrolyte layer, LiF, LiCl, and LiBr were used as the first salt; KBr was used as the second salt; and the molar ratio between LiF, LiCl, LiBr, and KBr was set to 6:18:46:30. A unit cell of Example 20 was made in the same manner as Example 1 except for the above.

Example 21

In the preparation of the electrolyte layer, LiF, LiCl, and LiBr were used as the first salt; NaCl was used as the second salt; and the molar ratio between LiF, LiCl, LiBr, and NaCl was set to 13:12:60:15. A unit cell of Example 21 was made in the same manner as Example 1 except for the above.

Example 22

In the preparation of the electrolyte layer, LiF, LiCl, and LiBr were used as the first salt; NaBr was used as the second salt; and the molar ratio between LiF, LiCl, LiBr, and NaBr was set to 13:24:48:15. A unit cell of Example 22 was made in the same manner as Example 1 except for the above.

Example 23

In the preparation of the electrolyte layer, LiF, LiCl, and LiBr were used as the first salt; KCl was used as the second salt; and the molar ratio between LiF, LiCl, LiBr, and KCl was set to 11:12:62:15. A unit cell of Example 23 was made in the same manner as Example 1 except for the above.

Example 24

In the preparation of the electrolyte layer, LiF, LiCl, and LiBr were used as the first salt; KBr was used as the second salt; and the molar ratio between LiF, LiCl, LiBr, and KBr was set to 12:20:53:15. A unit cell of Example 24 was made in the same manner as Example 1 except for the above.

Example 25

In the preparation of the electrolyte layer, LiF, LiCl, and LiBr were used as the first salt; NaCl was used as the second salt; and the molar ratio between LiF, LiCl, LiBr, and NaCl was set to 18:16:61:5. A unit cell of Example 25 was made in the same manner as Example 1 except for the above.

Example 26

In the preparation of the electrolyte layer, LiF, LiCl, and LiBr were used as the first salt; NaBr was used as the second salt; and the molar ratio between LiF, LiCl, LiBr, and NaBr was set to 17:23:55:5. A unit cell of Example 26 was made in the same manner as Example 1 except for the above.

Example 27

In the preparation of the electrolyte layer, LiF, LiCl, and LiBr were used as the first salt; KCl was used as the second salt; and the molar ratio between LiF, LiCl, LiBr, and KCl was set to 18:16:61:5. A unit cell of Example 27 was made in the same manner as Example 1 except for the above.

Example 28

In the preparation of the electrolyte layer, LiF, LiCl, and LiBr were used as the first salt; KBr was used as the second salt; and the molar ratio between LiF, LiCl, LiBr, and KBr was set to 18:20:57:5. A unit cell of Example 28 was made in the same manner as Example 1 except for the above.

Example 29

In the preparation of the electrolyte layer, LiF, LiCl, and LiBr were used as the first salt; NaCl was used as the second salt; and the molar ratio between LiF, LiCl, LiBr, and NaCl was set to 19:14:58:9. A unit cell of Example 29 was made in the same manner as Example 1 except for the above.

Example 30

In the preparation of the electrolyte layer, LiF, LiCl, and LiBr were used as the first salt; NaBr was used as the second salt; and the molar ratio between LiF, LiCl, LiBr, and NaBr was set to 19:23:49:9. A unit cell of Example 30 was made in the same manner as Example 1 except for the above.

Example 31

In the preparation of the electrolyte layer, LiF, LiCl, and LiBr were used as the first salt; KCl was used as the second salt; and the molar ratio between LiF, LiCl, LiBr, and KCl was set to 19:15:58:8. A unit cell of Example 31 was made in the same manner as Example 1 except for the above.

Example 32

In the preparation of the electrolyte layer, LiF, LiCl, and LiBr were used as the first salt; KBr was used as the second salt; and the molar ratio between LiF, LiCl, LiBr, and KBr was set to 19:19:55:7. A unit cell of Example 32 was made in the same manner as Example 1 except for the above.

Example 33

In the preparation of the electrolyte layer, LiF, LiCl, and LiBr were used as the first salt; NaCl was used as the second salt; and the molar ratio between LiF, LiCl, LiBr, and NaCl was set to 10:16:51:23. A unit cell of Example 33 was made in the same manner as Example 1 except for the above.

Example 34

In the preparation of the electrolyte layer, LiF, LiCl, and LiBr were used as the first salt; NaBr was used as the second salt; and the molar ratio between LiF, LiCl, LiBr, and NaBr was set to 10:39:28:23. A unit cell of Example 34 was made in the same manner as Example 1 except for the above.

Example 35

In the preparation of the electrolyte layer, LiF, LiCl, and LiBr were used as the first salt; KCl was used as the second salt; and the molar ratio between LiF, LiCl, LiBr, and KCl was set to 10:8:63:19. A unit cell of Example 35 was made in the same manner as Example 1 except for the above.

Example 36

In the preparation of the electrolyte layer, LiF, LiCl, and LiBr were used as the first salt; KBr was used as the second salt; and the molar ratio between LiF, LiCl, LiBr, and KBr was set to 10:18:52:20. A unit cell of Example 36 was made in the same manner as Example 1 except for the above.

Example 37

In the preparation of the electrolyte layer, LiF, LiCl, and LiBr were used as the first salt; NaCl was used as the second salt; and the molar ratio between LiF, LiCl, LiBr, and NaCl was set to 5:15:54:26. A unit cell of Example 37 was made in the same manner as Example 1 except for the above.

Example 38

In the preparation of the electrolyte layer, LiF, LiCl, and LiBr were used as the first salt; NaBr was used as the second salt; and the molar ratio between LiF, LiCl, LiBr, and NaBr was set to 5:41:28:26. A unit cell of Example 38 was made in the same manner as Example 1 except for the above.

Example 39

In the preparation of the electrolyte layer, LiF, LiCl, and LiBr were used as the first salt; KCl was used as the second salt; and the molar ratio between LiF, LiCl, LiBr, and KCl was set to 5:6:59:30. A unit cell of Example 39 was made in the same manner as Example 1 except for the above.

Example 40

In the preparation of the electrolyte layer, LiF, LiCl, and LiBr were used as the first salt; KBr was used as the second salt; and the molar ratio between LiF, LiCl, LiBr, and KBr was set to 5:16:49:30. A unit cell of Example 40 was made in the same manner as Example 1 except for the above.

Example 41

In the preparation of the electrolyte layer, LiF, LiCl, and LiBr were used as the first salt; NaCl was used as the second salt; and the molar ratio between LiF, LiCl, LiBr, and NaCl was set to 8:30:41:21. A unit cell of Example 41 was made in the same manner as Example 1 except for the above.

Example 42

In the preparation of the electrolyte layer, LiF, LiCl, and LiBr were used as the first salt; NaBr was used as the second salt; and the molar ratio between LiF, LiCl, LiBr, and NaBr was set to 11:30:44:15. A unit cell of Example 42 was made in the same manner as Example 1 except for the above.

Example 43

In the preparation of the electrolyte layer, LiF, LiCl, and LiBr were used as the first salt; KCl was used as the second salt; and the molar ratio between LiF, LiCl, LiBr, and KCl was set to 2:30:34:34. A unit cell of Example 43 was made in the same manner as Example 1 except for the above.

Example 44

In the preparation of the electrolyte layer, LiF, LiCl, and LiBr were used as the first salt; KBr was used as the second salt; and the molar ratio between LiF, LiCl, LiBr, and KBr was set to 2:30:37:31. A unit cell of Example 44 was made in the same manner as Example 1 except for the above.

Example 45

In the preparation of the electrolyte layer, LiF, LiCl, and LiBr were used as the first salt; NaCl was used as the second salt; and the molar ratio between LiF, LiCl, LiBr, and NaCl was set to 9:15:55:21. A unit cell of Example 45 was made in the same manner as Example 1 except for the above.

Example 46

In the preparation of the electrolyte layer, LiF, LiCl, and LiBr were used as the first salt; NaBr was used as the second salt; and the molar ratio between LiF, LiCl, LiBr, and NaBr was set to 15:15:58:12. A unit cell of Example 46 was made in the same manner as Example 1 except for the above.

Example 47

In the preparation of the electrolyte layer, LiF, LiCl, and LiBr were used as the first salt; KCl was used as the second salt; and the molar ratio between LiF, LiCl, LiBr, and KCl was set to 3:15:48:34. A unit cell of Example 47 was made in the same manner as Example 1 except for the above.

Example 48

In the preparation of the electrolyte layer, LiF, LiCl, and LiBr were used as the first salt; KBr was used as the second salt; and the molar ratio between LiF, LiCl, LiBr, and KBr was set to 2:15:48:35. A unit cell of Example 48 was made in the same manner as Example 1 except for the above.

Example 49

In the preparation of the electrolyte layer, LiF, LiCl, and LiBr were used as the first salt; NaCl was used as the second salt; and the molar ratio between LiF, LiCl, LiBr, and NaCl was set to 10:5:66:19. A unit cell of Example 49 was made in the same manner as Example 1 except for the above.

Example 50

In the preparation of the electrolyte layer, LiF, LiCl, and LiBr were used as the first salt; NaBr was used as the second salt; and the molar ratio between LiF, LiCl, LiBr, and NaBr was set to 18:5:68:9. A unit cell of Example 50 was made in the same manner as Example 1 except for the above.

Example 51

In the preparation of the electrolyte layer, LiF, LiCl, and LiBr were used as the first salt; KCl was used as the second salt; and the molar ratio between LiF, LiCl, LiBr, and KCl was set to 2:5:59:34. A unit cell of Example 51 was made in the same manner as Example 1 except for the above.

Example 52

In the preparation of the electrolyte layer, LiF, LiCl, and LiBr were used as the first salt; KBr was used as the second salt; and the molar ratio between LiF, LiCl, LiBr, and KBr was set to 3:5:57:35. A unit cell of Example 52 was made in the same manner as Example 1 except for the above.

Example 53

In the preparation of the electrolyte layer, LiF, LiCl, and LiBr were used as the first salt; NaCl was used as the second salt; and the molar ratio between LiF, LiCl, LiBr, and NaCl was set to 11:40:30:19. A unit cell of Example 53 was made in the same manner as Example 1 except for the above.

Example 54

In the preparation of the electrolyte layer, LiF, LiCl, and LiBr were used as the first salt; NaBr was used as the second salt; and the molar ratio between LiF, LiCl, LiBr, and NaBr was set to 7:40:30:23. A unit cell of Example 54 was made in the same manner as Example 1 except for the above.

Example 55

In the preparation of the electrolyte layer, LiF, LiCl, and LiBr were used as the first salt; KCl was used as the second salt; and the molar ratio between LiF, LiCl, LiBr, and KCl was set to 2:33:30:35. A unit cell of Example 55 was made in the same manner as Example 1 except for the above.

Example 56

In the preparation of the electrolyte layer, LiF, LiCl, and LiBr were used as the first salt; KBr was used as the second salt; and the molar ratio between LiF, LiCl, LiBr, and KBr was set to 2:35:30:33. A unit cell of Example 56 was made in the same manner as Example 1 except for the above.

Example 57

In the preparation of the electrolyte layer, LiF, LiCl, and LiBr were used as the first salt; NaCl was used as the second salt; and the molar ratio between LiF, LiCl, LiBr, and NaCl was set to 16:54:15:15. A unit cell of Example 57 was made in the same manner as Example 1 except for the above.

Example 58

In the preparation of the electrolyte layer, LiF, LiCl, and LiBr were used as the first salt; NaBr was used as the second salt; and the molar ratio between LiF, LiCl, LiBr, and NaBr was set to 7:52:15:26. A unit cell of Example 58 was made in the same manner as Example 1 except for the above.

Example 59

In the preparation of the electrolyte layer, LiF, LiCl, and LiBr were used as the first salt; KCl was used as the second salt; and the molar ratio between LiF, LiCl, LiBr, and KCl was set to 2:46:15:37. A unit cell of Example 59 was made in the same manner as Example 1 except for the above.

Example 60

In the preparation of the electrolyte layer, LiF, LiCl, and LiBr were used as the first salt; KBr was used as the second salt; and the molar ratio between LiF, LiCl, LiBr, and KBr was set to 2:48:15:35. A unit cell of Example 60 was made in the same manner as Example 1 except for the above.

Example 61

In the preparation of the electrolyte layer, LiF, LiCl, and LiBr were used as the first salt; NaCl was used as the second salt; and the molar ratio between LiF, LiCl, LiBr, and NaCl was set to 19:62:5:14. A unit cell of Example 61 was made in the same manner as Example 1 except for the above.

Example 62

In the preparation of the electrolyte layer, LiF, LiCl, and LiBr were used as the first salt; NaBr was used as the second salt; and the molar ratio between LiF, LiCl, LiBr, and NaBr was set to 7:60:5:28. A unit cell of Example 62 was made in the same manner as Example 1 except for the above.

Example 63

In the preparation of the electrolyte layer, LiF, LiCl, and LiBr were used as the first salt; KCl was used as the second salt; and the molar ratio between LiF, LiCl, LiBr, and KCl was set to 3:55:5:37. A unit cell of Example 63 was made in the same manner as Example 1 except for the above.

Example 64

In the preparation of the electrolyte layer, LiF, LiCl, and LiBr were used as the first salt; KBr was used as the second salt; and the molar ratio between LiF, LiCl, LiBr, and KBr was set to 3:56:5:36. A unit cell of Example 64 was made in the same manner as Example 1 except for the above.

Example 65

In the preparation of the electrolyte layer, LiF, LiCl, and LiBr were used as the first salt; NaF was used as the second salt; and the molar ratio between LiF, LiCl, LiBr, and NaF was set to 10:25:58:7. A unit cell of Example 65 was made in the same manner as Example 1 except for the above.

Example 66

In the preparation of the electrolyte layer, LiF, LiCl, and LiBr were used as the first salt; NaF was used as the second salt; and the molar ratio between LiF, LiCl, LiBr, and NaF was set to 6:26:58:10. A unit cell of Example 66 was made in the same manner as Example 1 except for the above.

Example 67

In the preparation of the electrolyte layer, LiF, LiCl, and LiBr were used as the first salt; NaF was used as the second salt; and the molar ratio between LiF, LiCl, LiBr, and NaF was set to 5:15:70:10. A unit cell of Example 67 was made in the same manner as Example 1 except for the above.

Example 68

In the preparation of the electrolyte layer, LiF, LiCl, and LiBr were used as the first salt; NaF was used as the second salt; and the molar ratio between LiF, LiCl, LiBr, and NaF was set to 7:10:73:10. A unit cell of Example 68 was made in the same manner as Example 1 except for the above.

Example 69

In the preparation of the electrolyte layer, LiF, LiCl, and LiBr were used as the first salt; NaF was used as the second salt; and the molar ratio between LiF, LiCl, LiBr, and NaF was set to 14:21:60:5. A unit cell of Example 69 was made in the same manner as Example 1 except for the above.

Example 70

In the preparation of the electrolyte layer, LiF, LiCl, and LiBr were used as the first salt; KF was used as the second salt; and the molar ratio between LiF, LiCl, LiBr, and KF was set to 10:22:61:7. A unit cell of Example 70 was made in the same manner as Example 1 except for the above.

Example 71

In the preparation of the electrolyte layer, LiF, LiCl, and LiBr were used as the first salt; KF was used as the second salt; and the molar ratio between LiF, LiCl, LiBr, and KF was set to 5:24:62:9. A unit cell of Example 71 was made in the same manner as Example 1 except for the above.

Example 72

In the preparation of the electrolyte layer, LiF, LiCl, and LiBr were used as the first salt; KF was used as the second salt; and the molar ratio between LiF, LiCl, LiBr, and KF was set to 5:15:70:10. A unit cell of Example 72 was made in the same manner as Example 1 except for the above.

Example 73

In the preparation of the electrolyte layer, LiF, LiCl, and LiBr were used as the first salt; KF was used as the second salt; and the molar ratio between LiF, LiCl, LiBr, and KF was set to 5:10:75:10. A unit cell of Example 73 was made in the same manner as Example 1 except for the above.

Example 74

In the preparation of the electrolyte layer, LiF, LiCl, and LiBr were used as the first salt; KF was used as the second salt; and the molar ratio between LiF, LiCl, LiBr, and KF was set to 13:21:61:5. A unit cell of Example 74 was made in the same manner as Example 1 except for the above.

Example 75

In the preparation of the electrolyte layer, LiF, LiCl, and LiBr were used as the first salt; NaF and KCl were used as the second salt; and the molar ratio between LiF, LiCl, LiBr, NaF, and KCl was set to 11:17:62:5:5. A unit cell of Example 75 was made in the same manner as Example 1 except for the above.

Example 76

In the preparation of the electrolyte layer, LiF, LiCl, and LiBr were used as the first salt; NaCl and KBr were used as the second salt; and the molar ratio between LiF, LiCl, LiBr, NaCl, and KBr was set to 15:16:59:5:5. A unit cell of Example 76 was made in the same manner as Example 1 except for the above.

Example 77

In the preparation of the electrolyte layer, LiF, LiCl, and LiBr were used as the first salt; NaBr and KCl were used as the second salt; and the molar ratio between LiF, LiCl, LiBr, NaBr, and KCl was set to 15:17:58:5:5. A unit cell of Example 77 was made in the same manner as Example 1 except for the above.

Example 78

In the preparation of the electrolyte layer, LiF, LiCl, and LiBr were used as the first salt; KF and NaF were used as the second salt; and the molar ratio between LiF, LiCl, LiBr, KF, and NaF was set to 6:21:63:5:5. A unit cell of Example 78 was made in the same manner as Example 1 except for the above.

Example 79

In the preparation of the electrolyte layer, LiF, LiCl, and LiBr were used as the first salt; KCl and KBr were used as the second salt; and the molar ratio between LiF, LiCl, LiBr, KCl, and KBr was set to 6:21:63:5:5. A unit cell of Example 79 was made in the same manner as Example 1 except for the above.

Example 80

In the preparation of the electrolyte layer, LiF and LiCl were used as the first salt; NaBr was used as the second salt; and the molar ratio between LiF, LiCl, and NaBr was set to 7:63:30. A unit cell of Example 80 was made in the same manner as Example 1 except for the above.

Example 81

In the preparation of the electrolyte layer, LiF and LiCl were used as the first salt; KF was used as the second salt; and the molar ratio between LiF, LiCl, and KF was set to 2:84:14. A unit cell of Example 81 was made in the same manner as Example 1 except for the above.

Example 82

In the preparation of the electrolyte layer, LiF and LiCl were used as the first salt; KBr was used as the second salt; and the molar ratio between LiF, LiCl, and KBr was set to 2:60:38. A unit cell of Example 82 was made in the same manner as Example 1 except for the above.

Example 83

In the preparation of the electrolyte layer, LiF and LiCl were used as the first salt; RbCl was used as the second salt; and the molar ratio between LiF, LiCl, and RbCl was set to 2:59:39. A unit cell of Example 83 was made in the same manner as Example 1 except for the above.

Example 84

In the preparation of the electrolyte layer, LiF and LiCl were used as the first salt; NaBr and KCl were added and used as the second salt; and the molar ratio between LiF, LiCl, NaBr, and KCl was set to 2:52:16:30. A unit cell of Example 84 was made in the same manner as Example 1 except for the above.

Example 85

In the preparation of the electrolyte layer, LiF and LiCl were used as the first salt; NaBr and KBr were used as the second salt; and the molar ratio between LiF, LiCl, NaBr, and KBr was set to 3:53:14:30. A unit cell of Example 85 was made in the same manner as Example 1 except for the above.

Example 86

In the preparation of the electrolyte layer, LiF and LiCl were used as the first salt; KCl and NaF were used as the second salt; and the molar ratio between LiF, LiCl, KCl, and NaF was set to 1:64:30:5. A unit cell of Example 86 was made in the same manner as Example 1 except for the above.

Example 87

In the preparation of the electrolyte layer, LiF and LiCl were used as the first salt; KCl and NaCl were used as the second salt; and the molar ratio between LiF, LiCl, KCl, and NaCl was set to 3:53:34:10. A unit cell of Example 87 was made in the same manner as Example 1 except for the above.

Example 88

In the preparation of the electrolyte layer, LiF and LiBr were used as the first salt; NaF was used as the second salt; and the molar ratio between LiF, LiBr, and NaF was set to 12:80:8. A unit cell of Example 88 was made in the same manner as Example 1 except for the above.

Example 89

In the preparation of the electrolyte layer, LiF and LiBr were used as the first salt; NaCl was used as the second salt; and the molar ratio between LiF, LiBr, and NaCl was set to 14:71:15. A unit cell of Example 89 was made in the same manner as Example 1 except for the above.

Example 90

In the preparation of the electrolyte layer, LiF and LiBr were used as the first salt; NaBr was used as the second salt; and the molar ratio between LiF, LiBr, and NaBr was set to 19:73:8. A unit cell of Example 90 was made in the same manner as Example 1 except for the above.

Example 91

In the preparation of the electrolyte layer, LiF and LiBr were used as the first salt; KF was used as the second salt; and the molar ratio between LiF, LiBr, and KF was set to 1:86:13. A unit cell of Example 91 was made in the same manner as Example 1 except for the above.

Example 92

In the preparation of the electrolyte layer, LiF and LiBr were used as the first salt; KCl was used as the second salt; and the molar ratio between LiF, LiBr, and KCl was set to 3:62:35. A unit cell of Example 92 was made in the same manner as Example 1 except for the above.

Example 93

In the preparation of the electrolyte layer, LiF and LiBr were used as the first salt; RbF was used as the second salt; and the molar ratio between LiF, LiBr, and RbF was set to 1:86:13. A unit cell of Example 93 was made in the same manner as Example 1 except for the above.

Example 94

In the preparation of the electrolyte layer, LiF and LiBr were used as the first salt; CsF was used as the second salt; and the molar ratio between LiF, LiBr, and CsF was set to 1:86:13. A unit cell of Example 94 was made in the same manner as Example 1 except for the above.

Example 95

In the preparation of the electrolyte layer, LiF and LiBr were used as the first salt; NaF and NaCl were used as the second salt; and the molar ratio between LiF, LiBr, NaF, and NaCl was set to 10:69:1:20. A unit cell of Example 95 was made in the same manner as Example 1 except for the above.

Example 96

In the preparation of the electrolyte layer, LiF and LiBr were used as the first salt; NaF and KCl were used as the second salt; and the molar ratio between LiF, LiBr, NaF, and KCl was set to 4:72:4:20. A unit cell of Example 96 was made in the same manner as Example 1 except for the above.

Example 97

In the preparation of the electrolyte layer, LiF and LiBr were used as the first salt; NaCl and KCl were used as the second salt; and the molar ratio between LiF, LiBr, NaCl, and KCl was set to 10:70:15:5. A unit cell of Example 97 was made in the same manner as Example 1 except for the above.

Example 98

In the preparation of the electrolyte layer, LiF and LiBr were used as the first salt; NaCl and KCl were used as the second salt; and the molar ratio between LiF, LiBr, NaCl, and KCl was set to 8:67:15:10. A unit cell of Example 98 was made in the same manner as Example 1 except for the above.

Example 99

In the preparation of the electrolyte layer, LiF and LiBr were used as the first salt; NaCl and KCl were used as the second salt; and the molar ratio between LiF, LiBr, NaCl, and KCl was set to 4:61:15:20. A unit cell of Example 99 was made in the same manner as Example 1 except for the above.

Example 100

In the preparation of the electrolyte layer, LiF and LiBr were used as the first salt; KCl and NaF were used as the second salt; and the molar ratio between LiF, LiBr, KCl, and NaF was set to 2:78:10:10. A unit cell of Example 100 was made in the same manner as Example 1 except for the above.

Example 101

In the preparation of the electrolyte layer, LiF and LiBr were used as the first salt; KCl and KF were used as the second salt; and the molar ratio between LiF, LiBr, KCl, and KF was set to 2:79:9:10. A unit cell of Example 101 was made in the same manner as Example 1 except for the above.

Example 102

In the preparation of the electrolyte layer, LiCl and LiBr were used as the first salt; NaF was used as the second salt; and the molar ratio between LiCl, LiBr, and NaF was set to 24:62:14. A unit cell of Example 102 was made in the same manner as Example 1 except for the above.

Example 103

In the preparation of the electrolyte layer, LiCl and LiBr were used as the first salt; NaCl was used as the second salt; and the molar ratio between LiCl, LiBr, and NaCl was set to 12:57:31. A unit cell of Example 103 was made in the same manner as Example 1 except for the above.

Example 104

In the preparation of the electrolyte layer, LiCl and LiBr were used as the first salt; NaBr was used as the second salt; and the molar ratio between LiCl, LiBr, and NaBr was set to 44:25:31. A unit cell of Example 104 was made in the same manner as Example 1 except for the above.

Example 105

In the preparation of the electrolyte layer, LiCl and LiBr were used as the first salt; KF was used as the second salt; and the molar ratio between LiCl, LiBr, and KF was set to 21:66:13. A unit cell of Example 105 was made in the same manner as Example 1 except for the above.

Example 106

In the preparation of the electrolyte layer, LiCl and LiBr were used as the first salt; RbF was used as the second salt; and the molar ratio between LiCl, LiBr, and RbF was set to 18:70:12. A unit cell of Example 106 was made in the same manner as Example 1 except for the above.

Example 107

In the preparation of the electrolyte layer, LiCl and LiBr were used as the first salt; CsF was used as the second salt; and the molar ratio between LiCl, LiBr, and CsF was set to 20:68:12. A unit cell of Example 107 was made in the same manner as Example 1 except for the above.

Example 108

In the preparation of the electrolyte layer, LiCl and LiBr were used as the first salt; NaF and KCl were used as the second salt; and the molar ratio between LiCl, LiBr, NaF, and KCl was set to 25:61:13:1. A unit cell of Example 108 was made in the same manner as Example 1 except for the above.

Example 109

In the preparation of the electrolyte layer, LiCl and LiBr were used as the first salt; NaF and KCl were used as the second salt; and the molar ratio between LiCl, LiBr, NaF, and KCl was set to 21:62:12:5. A unit cell of Example 109 was made in the same manner as Example 1 except for the above.

Example 110

In the preparation of the electrolyte layer, LiCl and LiBr were used as the first salt; NaF and KCl were used as the second salt; and the molar ratio between LiCl, LiBr, NaF, and KCl was set to 15:65:10:10. A unit cell of Example 110 was made in the same manner as Example 1 except for the above.

Example 111

In the preparation of the electrolyte layer, LiCl and LiBr were used as the first salt; NaF and KCl were used as the second salt; and the molar ratio between LiCl, LiBr, NaF, and KCl was set to 5:60:5:30. A unit cell of Example 111 was made in the same manner as Example 1 except for the above.

Example 112

In the preparation of the electrolyte layer, LiCl and LiBr were used as the first salt; NaCl and NaF were used as the second salt; and the molar ratio between LiCl, LiBr, NaCl, and NaF was set to 25:51:14:10. A unit cell of Example 112 was made in the same manner as Example 1 except for the above.

Example 113

In the preparation of the electrolyte layer, LiCl and LiBr were used as the first salt; NaCl and KCl were used as the second salt; and the molar ratio between LiCl, LiBr, NaCl, and KCl was set to 6:59:25:10. A unit cell of Example 113 was made in the same manner as Example 1 except for the above.

Example 114

In the preparation of the electrolyte layer, LiCl and LiBr were used as the first salt; NaCl and KF were used as the second salt; and the molar ratio between LiCl, LiBr, NaCl, and KF was set to 11:66:13:10. A unit cell of Example 114 was made in the same manner as Example 1 except for the above.

Example 115

In the preparation of the electrolyte layer, LiCl and LiBr were used as the first salt; KF and KCl were used as the second salt; and the molar ratio between LiCl, LiBr, KF, and KCl was set to 17:67:11:5. A unit cell of Example 115 was made in the same manner as Example 1 except for the above.

Example 116

In the preparation of the electrolyte layer, LiCl and LiBr were used as the first salt; KF and KCl were used as the second salt; and the molar ratio between LiCl, LiBr, KF, and KCl was set to 15:66:9:10. A unit cell of Example 116 was made in the same manner as Example 1 except for the above.

Example 117

In the preparation of the electrolyte layer, LiCl and LiBr were used as the first salt; KF and KCl were used as the second salt; and the molar ratio between LiCl, LiBr, KF, and KCl was set to 7:66:7:20. A unit cell of Example 117 was made in the same manner as Example 1 except for the above.

Example 118

In the preparation of the electrolyte layer, LiCl and LiBr were used as the first salt; KF and KCl were used as the second salt; and the molar ratio between LiCl, LiBr, KF, and KCl was set to 5:60:5:30. A unit cell of Example 118 was made in the same manner as Example 1 except for the above.

Example 119

In the preparation of the electrolyte layer, LiCl and LiBr were used as the first salt; KCl and NaF were used as the second salt; and the molar ratio between LiCl, LiBr, KCl, and NaF was set to 10:61:19:10. A unit cell of Example 119 was made in the same manner as Example 1 except for the above.

Example 120

In the preparation of the electrolyte layer, LiCl and LiBr were used as the first salt; KCl and KF were used as the second salt; and the molar ratio between LiCl, LiBr, KCl, and KF was set to 10:70:10:10. A unit cell of Example 120 was made in the same manner as Example 1 except for the above.

Example 121

In the preparation of the electrolyte layer, LiCl was used as the first salt; NaF and KCl were used as the second salt; and the molar ratio between LiCl, NaF, and KCl was set to 60:3:37. A unit cell of Example 121 was made in the same manner as Example 1 except for the above.

Example 122

In the preparation of the electrolyte layer, LiCl was used as the first salt; NaBr and KF were used as the second salt; and the molar ratio between LiCl, NaBr, and KF was set to 67:26:7. A unit cell of Example 122 was made in the same manner as Example 1 except for the above.

Example 123

In the preparation of the electrolyte layer, LiCl was used as the first salt; NaBr and RbF were used as the second salt; and the molar ratio between LiCl, NaBr, and RbF was set to 63:34:3. A unit cell of Example 123 was made in the same manner as Example 1 except for the above.

Example 124

In the preparation of the electrolyte layer, LiCl was used as the first salt; NaBr and CsF were used as the second salt; and the molar ratio between LiCl, NaBr, and CsF was set to 63:34:3. A unit cell of Example 124 was made in the same manner as Example 1 except for the above.

Example 125

In the preparation of the electrolyte layer, LiCl was used as the first salt; KF and KCl were used as the second salt; and the molar ratio between LiCl, KF, and KCl was set to 63:3:34. A unit cell of Example 125 was made in the same manner as Example 1 except for the above.

Example 126

In the preparation of the electrolyte layer, LiCl was used as the first salt; KF and KBr were used as the second salt; and the molar ratio between LiCl, KF, and KBr was set to 63:2:35. A unit cell of Example 126 was made in the same manner as Example 1 except for the above.

Example 127

In the preparation of the electrolyte layer, LiCl was used as the first salt; KCl and CsF were used as the second salt; and the molar ratio between LiCl, KCl, and CsF was set to 62:37:1. A unit cell of Example 127 was made in the same manner as Example 1 except for the above.

Example 128

In the preparation of the electrolyte layer, LiBr was used as the first salt; RbF and KCl were used as the second salt; and the molar ratio between LiBr, RbF, and KCl was set to 62:2:36. A unit cell of Example 128 was made in the same manner as Example 1 except for the above.

Example 129

In the preparation of the electrolyte layer, LiBr was used as the first salt; NaF and KCl were used as the second salt; and the molar ratio between LiBr, NaF, and KCl was set to 69:2:29. A unit cell of Example 129 was made in the same manner as Example 1 except for the above.

Example 130

In the preparation of the electrolyte layer, LiBr was used as the first salt; NaCl and KF were used as the second salt; and the molar ratio between LiBr, NaCl, and KF was set to 78:13:8. A unit cell of Example 130 was made in the same manner as Example 1 except for the above.

Example 131

In the preparation of the electrolyte layer, LiBr was used as the first salt; KF and NaBr were used as the second salt; and the molar ratio between LiBr, KF, and NaBr was set to 81:12:7. A unit cell of Example 131 was made in the same manner as Example 1 except for the above.

Example 132

In the preparation of the electrolyte layer, LiBr was used as the first salt; CsF and KCl were used as the second salt; and the molar ratio between LiBr, CsF, and KCl was set to 69:2:29. A unit cell of Example 132 was made in the same manner as Example 1 except for the above.

Example 133

In the preparation of the electrolyte layer, LiCl was used as the first salt; NaF, KCl, and NaCl were used as the second salt; and the molar ratio between LiCl, NaF, KCl, and NaCl was set to 53:2:35:10. A unit cell of Example 133 was made in the same manner as Example 1 except for the above.

Example 134

In the preparation of the electrolyte layer, LiCl was used as the first salt; KCl, NaF, and KF were used as the second salt; and the molar ratio between LiCl, NaF, KCl, and KF was set to 69:2:24:5. A unit cell of Example 134 was made in the same manner as Example 1 except for the above.

Example 135

In the preparation of the electrolyte layer, LiBr was used as the first salt; NaF, KCl, and KF were used as the second salt; and the molar ratio between LiBr, NaF, KCl, and KF was set to 81:2:7:10. A unit cell of Example 135 was made in the same manner as Example 1 except for the above.

Example 136

In the preparation of the electrolyte layer, LiBr was used as the first salt; NaCl, NaF, and KCl were used as the second salt; and the molar ratio between LiBr, NaF, KCl, and NaCl was set to 74:6:10:10. A unit cell of Example 136 was made in the same manner as Example 1 except for the above.

Example 137

In the preparation of the electrolyte layer, LiBr was used as the first salt; KF, NaF, and NaCl were used as the second salt; and the molar ratio between LiBr, KF, NaF, and NaCl was set to 80:8:2:10. A unit cell of Example 137 was made in the same manner as Example 1 except for the above.

Example 138

In the preparation of the electrolyte layer, LiCl was used as the first salt; KCl, NaF, KF, and KBr were used as the second salt; and the molar ratio between LiCl, KCl, NaF, KF, and KBr was set to 71:18:1:5:5. A unit cell of Example 138 was made in the same manner as Example 1 except for the above.

Example 139

In the preparation of the electrolyte layer, LiBr was used as the first salt; KF, NaF, NaCl, and NaBr were used as the second salt; and the molar ratio between LiBr, KF, NaF, NaCl, and NaBr was set to 79:10:2:4:5. A unit cell of Example 139 was made in the same manner as Example 1 except for the above.

Example 140

In the preparation of the electrolyte layer, LiF, LiCl, and LiBr were used as the first salt; LiI was used as the second salt; and the molar ratio between LiF, LiCl, LiBr, and LiI was set to 18:22:50:10. A unit cell of Example 140 was made in the same manner as Example 1 except for the above.

Example 141

In the preparation of the electrolyte layer, LiF, LiCl, and LiBr were used as the first salt; LiI was used as the second salt; and the molar ratio between LiF, LiCl, LiBr, and LiI was set to 15:21:44:20. A unit cell of Example 141 was made in the same manner as Example 1 except for the above.

Example 142

In the preparation of the electrolyte layer, LiF, LiCl, and LiI were used as the first salt; NaBr was used as the second salt; and the molar ratio between LiF, LiCl, LiI, and NaBr was set to 5:44:20:31. A unit cell of Example 142 was made in the same manner as Example 1 except for the above.

Example 143

In the preparation of the electrolyte layer, LiF, LiBr, and LiI were used as the first salt; NaF was used as the second salt; and the molar ratio between LiF, LiBr, LiI, and NaF was set to 7:66:20:7. A unit cell of Example 143 was made in the same manner as Example 1 except for the above.

Example 144

In the preparation of the electrolyte layer, LiF, LiBr, and LiI were used as the first salt; NaCl was used as the second salt; and the molar ratio between LiF, LiBr, LiI, and NaCl was set to 9:61:10:20. A unit cell of Example 144 was made in the same manner as Example 1 except for the above.

Example 145

In the preparation of the electrolyte layer, LiF, LiBr, and LiI were used as the first salt; NaCl was used as the second salt; and the molar ratio between LiF, LiBr, LiI, and NaCl was set to 6:49:20:25. A unit cell of Example 145 was made in the same manner as Example 1 except for the above.

Example 146

In the preparation of the electrolyte layer, LiF, LiBr, and LiI were used as the first salt; NaBr was used as the second salt; and the molar ratio between LiF, LiBr, LiI, and NaBr was set to 16:63:11:10. A unit cell of Example 146 was made in the same manner as Example 1 except for the above.

Example 147

In the preparation of the electrolyte layer, LiF, LiBr, and LiI were used as the first salt; NaBr was used as the second salt; and the molar ratio between LiF, LiBr, LiI, and NaBr was set to 12:55:20:13. A unit cell of Example 147 was made in the same manner as Example 1 except for the above.

Example 148

In the preparation of the electrolyte layer, LiCl, LiBr, and LiI were used as the first salt; NaF was used as the second salt; and the molar ratio between LiCl, LiBr, LiI, and NaF was set to 21:57:10:12. A unit cell of Example 148 was made in the same manner as Example 1 except for the above.

Example 149

In the preparation of the electrolyte layer, LiCl, LiBr, and LiI were used as the first salt; NaF was used as the second salt; and the molar ratio between LiCl, LiBr, LiI, and NaF was set to 21:48:20:11. A unit cell of Example 149 was made in the same manner as Example 1 except for the above.

Example 150

In the preparation of the electrolyte layer, LiCl, LiBr, and LiI were used as the first salt; NaBr was used as the second salt; and the molar ratio between LiCl, LiBr, LiI, and NaBr was set to 36:22:10:32. A unit cell of Example 150 was made in the same manner as Example 1 except for the above.

Example 151

In the preparation of the electrolyte layer, LiCl, LiBr, and LiI were used as the first salt; NaBr was used as the second salt; and the molar ratio between LiCl, LiBr, LiI, and NaBr was set to 30:18:20:32. A unit cell of Example 151 was made in the same manner as Example 1 except for the above.

Example 152

In the preparation of the electrolyte layer, LiCl, LiBr, and LiI were used as the first salt; KF was used as the second salt; and the molar ratio between LiCl, LiBr, LiI, and KF was set to 20:59:10:12. A unit cell of Example 152 was made in the same manner as Example 1 except for the above.

Example 153

In the preparation of the electrolyte layer, LiCl, LiBr, and LiI were used as the first salt; KF was used as the second salt; and the molar ratio between LiCl, LiBr, LiI, and KF was set to 19:50:20:10. A unit cell of Example 153 was made in the same manner as Example 1 except for the above.

Example 154

In the preparation of the electrolyte layer, LiBr and LiI were used as the first salt; CsF was used as the second salt; and the molar ratio between LiBr, LiI, and CsF was set to 82:6:12. A unit cell of Example 154 was made in the same manner as Example 1 except for the above.

Example 155

In the preparation of the electrolyte layer, LiBr and KI were used as the first salt; NaCl was used as the second salt; and the molar ratio between LiBr, KI, and NaCl was set to 70:4:26. A unit cell of Example 155 was made in the same manner as Example 1 except for the above.

Tables 3, 5, 7, 9, and 11 show the types of salts forming the molten salt, the mixing ratio of the salts, the proportion of Li-ion relative to the total amount of cation, the proportion of F-ion relative to the total amount of anion, and the proportion of I-ion relative to the total amount of anion in respective Examples.

Tables 4, 6, 8, 10, and 12 show the melting point, the electric conductivity at 500° C. of the molten salt used in the examples, and DC-IRs at 500° C. and at 430° C. of the unit cell of the examples. The DC-IRs at 500° C. and at 430° C. were the values obtained during discharge at a current density of 1.0 A·cm$^{-2}$.

TABLE 3

| | Types of Salt | Mixing Ratio of Salts (molar ratio) | Li-ion Prop. (mol %) | F-ion Prop. (mol %) | I-ion Prop. (mol %) |
|---|---|---|---|---|---|
| Ex. 7 | LiF + LiCl + LiBr + RbF | 5:18:67:10 | 90 | 15 | 0 |
| Ex. 8 | LiF + LiCl + LiBr + RbCl | 14:13:63:10 | 90 | 14 | 0 |
| Ex. 9 | LiF + LiCl + LiBr + RbBr | 14:18:58:10 | 90 | 14 | 0 |
| Ex. 10 | LiF + LiCl + LiBr + CsF | 5:20:65:10 | 90 | 15 | 0 |
| Ex. 11 | LiF + LiCl + LiBr + CsCl | 13:15:62:10 | 90 | 13 | 0 |
| Ex. 12 | LiF + LiCl + LiBr + CsBr | 13:21:56:10 | 90 | 13 | 0 |
| Ex. 13 | LiF + LiCl + LiBr + NaCl | 1:14:35:50 | 50 | 1 | 0 |
| Ex. 14 | LiF + LiCl + LiBr + NaBr | 1:40:9:50 | 50 | 1 | 0 |
| Ex. 15 | LiF + LiCl + LiBr + KCl | 2:3:45:50 | 50 | 2 | 0 |
| Ex. 16 | LiF + LiCl + LiBr + KBr | 2:13:35:50 | 50 | 2 | 0 |
| Ex. 17 | LiF + LiCl + LiBr + NaCl | 8:14:48:30 | 70 | 8 | 0 |
| Ex. 18 | LiF + LiCl + LiBr + NaBr | 8:35:27:30 | 70 | 8 | 0 |
| Ex. 19 | LiF + LiCl + LiBr + KCl | 6:7:57:30 | 70 | 6 | 0 |
| Ex. 20 | LiF + LiCl + LiBr + KBr | 6:18:46:30 | 70 | 6 | 0 |
| Ex. 21 | LiF + LiCl + LiBr + NaCl | 13:12:60:15 | 85 | 13 | 0 |
| Ex. 22 | LiF + LiCl + LiBr + NaBr | 13:24:48:15 | 85 | 13 | 0 |
| Ex. 23 | LiF + LiCl + LiBr + KCl | 11:12:62:15 | 85 | 11 | 0 |
| Ex. 24 | LiF + LiCl + LiBr + KBr | 12:20:53:15 | 85 | 12 | 0 |
| Ex. 25 | LiF + LiCl + LiBr + NaCl | 18:16:61:5 | 95 | 18 | 0 |
| Ex. 26 | LiF + LiCl + LiBr + NaBr | 17:23:55:5 | 95 | 17 | 0 |
| Ex. 27 | LiF + LiCl + LiBr + KCl | 18:16:61:5 | 95 | 18 | 0 |
| Ex. 28 | LiF + LiCl + LiBr + KBr | 18:20:57:5 | 95 | 18 | 0 |

TABLE 3-continued

|  | Types of Salt | Mixing Ratio of Salts (molar ratio) | Li-ion Prop. (mol %) | F-ion Prop. (mol %) | I-ion Prop. (mol %) |
|---|---|---|---|---|---|
| Ex. 29 | LiF + LiCl + LiBr + NaCl | 19:14:58:9 | 91 | 19 | 0 |
| Ex. 30 | LiF + LiCl + LiBr + NaBr | 19:23:49:9 | 91 | 19 | 0 |
| Ex. 31 | LiF + LiCl + LiBr + KCl | 19:15:58:8 | 92 | 19 | 0 |
| Ex. 32 | LiF + LiCl + LiBr + KBr | 19:19:55:7 | 93 | 19 | 0 |
| Ex. 33 | LiF + LiCl + LiBr + NaCl | 10:16:51:23 | 77 | 10 | 0 |
| Ex. 34 | LiF + LiCl + LiBr + NaBr | 10:39:28:23 | 77 | 10 | 0 |
| Ex. 35 | LiF + LiCl + LiBr + KCl | 10:8:63:19 | 81 | 10 | 0 |
| Ex. 36 | LiF + LiCl + LiBr + KBr | 10:18:52:20 | 80 | 10 | 0 |
| Ex. 37 | LiF + LiCl + LiBr + NaCl | 5:15:54:26 | 74 | 5 | 0 |
| Ex. 38 | LiF + LiCl + LiBr + NaBr | 5:41:28:26 | 74 | 5 | 0 |

TABLE 4

|  | Melting Point (° C.) | Electric Conductivity at 500° C. (S/cm) | DC-IR at 500° C. (mΩ) | DC-IR at 430° C. (mΩ) |
|---|---|---|---|---|
| Ex. 7 | 425 | 2.8 | 83 | 94 |
| Ex. 8 | 425 | 3.2 | 73 | 83 |
| Ex. 9 | 425 | 3.2 | 74 | 84 |
| Ex. 10 | 425 | 3.2 | 74 | 84 |
| Ex. 11 | 425 | 3.2 | 73 | 84 |
| Ex. 12 | 425 | 3.2 | 73 | 84 |
| Ex. 13 | 430 | 2.2 | 100 | 112 |
| Ex. 14 | 430 | 2.6 | 89 | 102 |
| Ex. 15 | 365 | 2.3 | 98 | 109 |
| Ex. 16 | 350 | 2.2 | 100 | 111 |
| Ex. 17 | 410 | 2.8 | 85 | 96 |
| Ex. 18 | 405 | 2.7 | 87 | 97 |
| Ex. 19 | 390 | 2.2 | 100 | 110 |
| Ex. 20 | 385 | 2.2 | 100 | 111 |
| Ex. 21 | 420 | 3.3 | 71 | 82 |
| Ex. 22 | 420 | 3.3 | 72 | 83 |
| Ex. 23 | 420 | 3.0 | 79 | 89 |
| Ex. 24 | 415 | 3.0 | 80 | 90 |
| Ex. 25 | 430 | 3.7 | 62 | 73 |
| Ex. 26 | 430 | 3.7 | 61 | 71 |
| Ex. 27 | 430 | 3.6 | 63 | 74 |
| Ex. 28 | 430 | 3.6 | 63 | 75 |
| Ex. 29 | 425 | 3.6 | 62 | 72 |
| Ex. 30 | 425 | 3.6 | 62 | 73 |
| Ex. 31 | 430 | 3.6 | 63 | 74 |
| Ex. 32 | 430 | 3.6 | 64 | 76 |
| Ex. 33 | 405 | 3.0 | 78 | 89 |
| Ex. 34 | 405 | 3.0 | 78 | 89 |
| Ex. 35 | 395 | 2.8 | 85 | 96 |
| Ex. 36 | 395 | 2.7 | 87 | 98 |
| Ex. 37 | 415 | 2.8 | 85 | 95 |
| Ex. 38 | 415 | 2.8 | 85 | 96 |

TABLE 5

|  | Types of Salts | Mixing Ratio of Salts (molar ratio) | Li-ion Prop. (mol %) | F-ion Prop. (mol %) | I-ion Prop. (mol %) |
|---|---|---|---|---|---|
| Ex. 39 | LiF + LiCl + LiBr + KCl | 5:6:59:30 | 70 | 5 | 0 |
| Ex. 40 | LiF + LiCl + LiBr + KBr | 5:16:49:30 | 70 | 5 | 0 |
| Ex. 41 | LiF + LiCl + LiBr + NaCl | 8:30:41:21 | 79 | 8 | 0 |
| Ex. 42 | LiF + LiCl + LiBr + NaBr | 11:30:44:15 | 85 | 11 | 0 |
| Ex. 43 | LiF + LiCl + LiBr + KCl | 2:30:34:34 | 66 | 2 | 0 |
| Ex. 44 | LiF + LiCl + LiBr + KBr | 2:30:37:31 | 69 | 2 | 0 |
| Ex. 45 | LiF + LiCl + LiBr + NaCl | 9:15:55:21 | 79 | 9 | 0 |
| Ex. 46 | LiF + LiCl + LiBr + NaBr | 15:15:58:12 | 88 | 15 | 0 |
| Ex. 47 | LiF + LiCl + LiBr + KCl | 3:15:48:34 | 66 | 3 | 0 |
| Ex. 48 | LiF + LiCl + LiBr + KBr | 2:15:48:35 | 65 | 2 | 0 |
| Ex. 49 | LiF + LiCl + LiBr + NaCl | 10:5:66:19 | 81 | 10 | 0 |
| Ex. 50 | LiF + LiCl + LiBr + NaBr | 18:5:68:9 | 91 | 18 | 0 |
| Ex. 51 | LiF + LiCl + LiBr + KCl | 2:5:59:34 | 66 | 2 | 0 |
| Ex. 52 | LiF + LiCl + LiBr + KBr | 3:5:57:35 | 65 | 3 | 0 |
| Ex. 53 | LiF + LiCl + LiBr + NaCl | 11:40:30:19 | 81 | 11 | 0 |
| Ex. 54 | LiF + LiCl + LiBr + NaBr | 7:40:30:23 | 77 | 7 | 0 |
| Ex. 55 | LiF + LiCl + LiBr + KCl | 2:33:30:35 | 65 | 2 | 0 |
| Ex. 56 | LiF + LiCl + LiBr + KBr | 2:35:30:33 | 67 | 2 | 0 |
| Ex. 57 | LiF + LiCl + LiBr + NaCl | 16:54:15:15 | 85 | 16 | 0 |
| Ex. 58 | LiF + LiCl + LiBr + NaBr | 7:52:15:26 | 74 | 7 | 0 |
| Ex. 59 | LiF + LiCl + LiBr + KCl | 2:46:15:37 | 63 | 2 | 0 |
| Ex. 60 | LiF + LiCl + LiBr + KBr | 2:48:15:35 | 65 | 2 | 0 |
| Ex. 61 | LiF + LiCl + LiBr + NaCl | 19:62:5:14 | 86 | 19 | 0 |
| Ex. 62 | LiF + LiCl + LiBr + NaBr | 7:60:5:28 | 72 | 7 | 0 |
| Ex. 63 | LiF + LiCl + LiBr + KCl | 3:55:5:37 | 63 | 3 | 0 |
| Ex. 64 | LiF + LiCl + LiBr + KBr | 3:56:5:36 | 64 | 3 | 0 |
| Ex. 65 | LiF + LiCl + LiBr + NaF | 10:25:58:7 | 93 | 17 | 0 |
| Ex. 66 | LiF + LiCl + LiBr + NaF | 6:26:58:10 | 90 | 16 | 0 |
| Ex. 67 | LiF + LiCl + LiBr + NaF | 5:15:70:10 | 90 | 15 | 0 |
| Ex. 68 | LiF + LiCl + LiBr + NaF | 7:10:73:10 | 90 | 17 | 0 |

TABLE 5-continued

| | Types of Salts | Mixing Ratio of Salts (molar ratio) | Li-ion Prop. (mol %) | F-ion Prop. (mol %) | I-ion Prop. (mol %) |
|---|---|---|---|---|---|
| Ex. 69 | LiF + LiCl + LiBr + NaF | 14:21:60:5 | 95 | 19 | 0 |
| Ex. 70 | LiF + LiCl + LiBr + KF | 10:22:61:7 | 93 | 17 | 0 |

TABLE 6

| | Melting Point (°C.) | Electric Conductivity at 500° C. (S/cm) | DC-IR at 500° C. (mΩ) | DC-IR at 430° C. (mΩ) |
|---|---|---|---|---|
| Ex. 39 | 370 | 2.2 | 100 | 112 |
| Ex. 40 | 355 | 2.2 | 100 | 111 |
| Ex. 41 | 420 | 3.1 | 77 | 87 |
| Ex. 42 | 415 | 3.2 | 73 | 84 |
| Ex. 43 | 380 | 2.2 | 100 | 111 |
| Ex. 44 | 360 | 2.2 | 100 | 112 |
| Ex. 45 | 410 | 3.0 | 78 | 89 |
| Ex. 46 | 430 | 3.4 | 70 | 80 |
| Ex. 47 | 380 | 2.5 | 92 | 102 |
| Ex. 48 | 360 | 2.3 | 98 | 108 |
| Ex. 49 | 420 | 3.6 | 64 | 74 |
| Ex. 50 | 430 | 3.7 | 62 | 69 |
| Ex. 51 | 420 | 2.5 | 93 | 104 |
| Ex. 52 | 380 | 2.3 | 99 | 110 |
| Ex. 53 | 430 | 3.3 | 72 | 83 |
| Ex. 54 | 415 | 2.9 | 81 | 91 |
| Ex. 55 | 390 | 2.3 | 98 | 109 |
| Ex. 56 | 370 | 2.2 | 100 | 111 |
| Ex. 57 | 430 | 3.5 | 64 | 76 |
| Ex. 58 | 425 | 2.9 | 82 | 93 |
| Ex. 59 | 400 | 2.2 | 100 | 111 |
| Ex. 60 | 385 | 2.2 | 100 | 111 |
| Ex. 61 | 430 | 3.1 | 78 | 89 |
| Ex. 62 | 430 | 2.9 | 82 | 93 |
| Ex. 63 | 410 | 2.6 | 90 | 100 |
| Ex. 64 | 400 | 2.4 | 95 | 105 |
| Ex. 65 | 430 | 3.5 | 65 | 78 |
| Ex. 66 | 430 | 3.4 | 69 | 80 |
| Ex. 67 | 430 | 3.3 | 71 | 81 |
| Ex. 68 | 430 | 3.3 | 70 | 81 |
| Ex. 69 | 430 | 3.6 | 61 | 75 |
| Ex. 70 | 430 | 3.5 | 67 | 77 |

TABLE 7

| | Types of Salts | Mixing Ratio of Salts (molar ratio) | Li-ion Prop. (mol %) | F-ion Prop. (mol %) | I-ion Prop. (mol %) |
|---|---|---|---|---|---|
| Ex. 71 | LiF + LiCl + LiBr + KF | 5:24:62:9 | 91 | 14 | 0 |
| Ex. 72 | LiF + LiCl + LiBr + KF | 5:15:70:10 | 90 | 15 | 0 |
| Ex. 73 | LiF + LiCl + LiBr + KF | 5:10:75:10 | 90 | 15 | 0 |
| Ex. 74 | LiF + LiCl + LiBr + KF | 13:21:61:5 | 90 | 18 | 0 |
| Ex. 75 | LiF + LiCl + LiBr + NaF + KCl | 11:17:62:5:5 | 90 | 16 | 0 |
| Ex. 76 | LiF + LiCl + LiBr + NaCl + KBr | 15:16:59:5:5 | 90 | 15 | 0 |
| Ex. 77 | LiF + LiCl + LiBr + NaBr + KCl | 15:17:58:5:5 | 90 | 15 | 0 |
| Ex. 78 | LiF + LiCl + LiBr + KF + NaF | 6:21:63:5:5 | 90 | 16 | 0 |
| Ex. 79 | LiF + LiCl + LiBr + KCl + KBr | 6:21:63:5:5 | 90 | 6 | 0 |
| Ex. 80 | LiF + LiCl + NaBr | 7:63:30 | 70 | 7 | 0 |
| Ex. 81 | LiF + LiCl + KF | 2:84:14 | 86 | 16 | 0 |
| Ex. 82 | LiF + LiCl + KBr | 2:60:38 | 62 | 2 | 0 |
| Ex. 83 | LiF + LiCl + RbCl | 2:59:39 | 61 | 2 | 0 |
| Ex. 84 | LiF + LiCl + NaBr + KCl | 2:52:16:30 | 54 | 2 | 0 |
| Ex. 85 | LiF + LiCl + NaBr + KBr | 3:53:14:30 | 56 | 3 | 0 |
| Ex. 86 | LiF + LiCl + KCl + NaF | 1:64:30:5 | 65 | 6 | 0 |
| Ex. 87 | LiF + LiCl + KCl + NaCl | 3:53:34:10 | 56 | 3 | 0 |
| Ex. 88 | LiF + LiBr + NaF | 12:80:8 | 92 | 20 | 0 |
| Ex. 89 | LiF + LiBr + NaCl | 14:71:15 | 85 | 14 | 0 |
| Ex. 90 | LiF + LiBr + NaBr | 19:73:8 | 92 | 19 | 0 |
| Ex. 91 | LiF + LiBr + KF | 1:86:13 | 87 | 14 | 0 |
| Ex. 92 | LiF + LiBr + KCl | 3:62:35 | 65 | 3 | 0 |
| Ex. 93 | LiF + LiBr + RbF | 1:86:13 | 87 | 14 | 0 |
| Ex. 94 | LiF + LiBr + CsF | 1:86:13 | 87 | 14 | 0 |
| Ex. 95 | LiF + LiBr + NaF + NaCl | 10:69:1:20 | 79 | 11 | 0 |
| Ex. 96 | LiF + LiBr + NaF + KCl | 4:72:4:20 | 76 | 8 | 0 |
| Ex. 97 | LiF + LiBr + NaCl + KCl | 10:70:15:5 | 80 | 10 | 0 |
| Ex. 98 | LiF + LiBr + NaCl + KCl | 8:67:15:10 | 75 | 8 | 0 |
| Ex. 99 | LiF + LiBr + NaCl + KCl | 4:61:15:20 | 65 | 4 | 0 |
| Ex. 100 | LiF + LiBr + KCl + NaF | 2:78:10:10 | 80 | 12 | 0 |
| Ex. 101 | LiF + LiBr + KCl + KF | 2:79:9:10 | 81 | 12 | 0 |
| Ex. 102 | LiCl + LiBr + NaF | 24:62:14 | 86 | 14 | 0 |

TABLE 8

|  | Melting Point (° C.) | Electric Conductivity at 500° C. (S/cm) | DC-IR at 500° C. (mΩ) | DC-IR at 430° C. (mΩ) |
| --- | --- | --- | --- | --- |
| Ex. 71 | 430 | 3.3 | 72 | 82 |
| Ex. 72 | 430 | 3.7 | 62 | 70 |
| Ex. 73 | 430 | 3.7 | 60 | 72 |
| Ex. 74 | 430 | 3.6 | 64 | 74 |
| Ex. 75 | 425 | 3.3 | 70 | 81 |
| Ex. 76 | 425 | 3.4 | 69 | 80 |
| Ex. 77 | 425 | 3.4 | 69 | 79 |
| Ex. 78 | 425 | 3.3 | 70 | 81 |
| Ex. 79 | 425 | 3.1 | 76 | 87 |
| Ex. 80 | 430 | 3.5 | 66 | 76 |
| Ex. 81 | 430 | 3.9 | 60 | 69 |
| Ex. 82 | 360 | 2.4 | 96 | 107 |
| Ex. 83 | 395 | 2.3 | 97 | 108 |
| Ex. 84 | 420 | 2.5 | 94 | 104 |
| Ex. 85 | 400 | 2.3 | 97 | 108 |
| Ex. 86 | 415 | 2.3 | 98 | 109 |
| Ex. 87 | 390 | 2.2 | 100 | 111 |
| Ex. 88 | 430 | 3.1 | 78 | 89 |
| Ex. 89 | 420 | 2.9 | 82 | 93 |
| Ex. 90 | 430 | 3.3 | 72 | 82 |
| Ex. 91 | 420 | 2.5 | 94 | 104 |
| Ex. 92 | 350 | 2.2 | 100 | 111 |
| Ex. 93 | 415 | 2.2 | 99 | 112 |
| Ex. 94 | 410 | 2.4 | 95 | 106 |
| Ex. 95 | 430 | 3.5 | 66 | 78 |
| Ex. 96 | 410 | 3.0 | 80 | 90 |
| Ex. 97 | 400 | 2.9 | 81 | 91 |
| Ex. 98 | 385 | 2.7 | 88 | 99 |
| Ex. 99 | 370 | 2.2 | 100 | 112 |
| Ex. 100 | 420 | 2.7 | 86 | 97 |
| Ex. 101 | 410 | 2.7 | 88 | 98 |
| Ex. 102 | 425 | 2.9 | 81 | 91 |

TABLE 10

|  | Melting Point (° C.) | Electric Conductivity at 500° C. (S/cm) | DC-IR at 500° C. (mΩ) | DC-IR at 430° C. (mΩ) |
| --- | --- | --- | --- | --- |
| Ex. 103 | 420 | 2.4 | 96 | 107 |
| Ex. 104 | 425 | 2.9 | 81 | 92 |
| Ex. 105 | 410 | 2.8 | 85 | 96 |
| Ex. 106 | 405 | 2.6 | 91 | 102 |
| Ex. 107 | 400 | 2.7 | 87 | 98 |
| Ex. 108 | 415 | 3.1 | 75 | 86 |
| Ex. 109 | 410 | 3.0 | 79 | 90 |
| Ex. 110 | 400 | 2.8 | 85 | 96 |
| Ex. 111 | 370 | 2.2 | 100 | 112 |
| Ex. 112 | 405 | 2.9 | 82 | 93 |
| Ex. 113 | 400 | 2.3 | 99 | 110 |
| Ex. 114 | 390 | 2.7 | 86 | 97 |
| Ex. 115 | 405 | 2.9 | 82 | 93 |
| Ex. 116 | 400 | 2.7 | 87 | 98 |
| Ex. 117 | 380 | 2.3 | 97 | 108 |
| Ex. 118 | 370 | 2.2 | 100 | 112 |
| Ex. 119 | 390 | 2.6 | 90 | 101 |
| Ex. 120 | 390 | 2.6 | 89 | 100 |
| Ex. 121 | 385 | 2.2 | 100 | 112 |
| Ex. 122 | 430 | 2.6 | 90 | 101 |
| Ex. 123 | 400 | 2.3 | 98 | 109 |
| Ex. 124 | 400 | 2.4 | 95 | 106 |
| Ex. 125 | 400 | 2.2 | 100 | 111 |
| Ex. 126 | 400 | 2.2 | 100 | 111 |
| Ex. 127 | 400 | 2.2 | 100 | 111 |
| Ex. 128 | 400 | 2.2 | 100 | 111 |
| Ex. 129 | 350 | 2.2 | 100 | 111 |
| Ex. 130 | 425 | 2.7 | 87 | 97 |
| Ex. 131 | 425 | 2.8 | 85 | 96 |
| Ex. 132 | 350 | 2.2 | 100 | 110 |
| Ex. 133 | 385 | 2.2 | 100 | 111 |
| Ex. 134 | 425 | 2.5 | 93 | 104 |

TABLE 9

|  | Types of Salts | Mixing Ratio of Salts (molar ratio) | Li-ion Prop. (mol %) | F-ion Prop. (mol %) | I-ion Prop. (mol %) |
| --- | --- | --- | --- | --- | --- |
| Ex. 103 | LiCl + LiBr + NaCl | 12:57:31 | 69 | 0 | 0 |
| Ex. 104 | LiCl + LiBr + NaBr | 44:25:31 | 69 | 0 | 0 |
| Ex. 105 | LiCl + LiBr + KF | 21:66:13 | 87 | 13 | 0 |
| Ex. 106 | LiCl + LiBr + RbF | 18:70:12 | 88 | 12 | 0 |
| Ex. 107 | LiCl + LiBr + CsF | 20:68:12 | 88 | 12 | 0 |
| Ex. 108 | LiCl + LiBr + NaF + KCl | 25:61:13:1 | 86 | 13 | 0 |
| Ex. 109 | LiCl + LiBr + NaF + KCl | 21:62:12:5 | 83 | 12 | 0 |
| Ex. 110 | LiCl + LiBr + NaF + KCl | 15:65:10:10 | 80 | 10 | 0 |
| Ex. 111 | LiCl + LiBr + NaF + KCl | 5:60:5:30 | 65 | 5 | 0 |
| Ex. 112 | LiCl + LiBr + NaCl + NaF | 25:51:14:10 | 76 | 10 | 0 |
| Ex. 113 | LiCl + LiBr + NaCl + KCl | 6:59:25:10 | 65 | 0 | 0 |
| Ex. 114 | LiCl + LiBr + NaCl + KF | 11:66:13:10 | 77 | 10 | 0 |
| Ex. 115 | LiCl + LiBr + KF + KCl | 17:67:11:5 | 84 | 11 | 0 |
| Ex. 116 | LiCl + LiBr + KF + KCl | 15:66:9:10 | 81 | 9 | 0 |
| Ex. 117 | LiCl + LiBr + KF + KCl | 7:66:7:20 | 73 | 7 | 0 |
| Ex. 118 | LiCl + LiBr + KF + KCl | 5:60:5:30 | 65 | 5 | 0 |
| Ex. 119 | LiCl + LiBr + KCl + NaF | 10:61:19:10 | 71 | 10 | 0 |
| Ex. 120 | LiCl + LiBr + KCl + KF | 10:70:10:10 | 80 | 10 | 0 |
| Ex. 121 | LiCl + NaF + KCl | 60:3:37 | 60 | 3 | 0 |
| Ex. 122 | LiCl + NaBr + KF | 67:26:7 | 67 | 7 | 0 |
| Ex. 123 | LiCl + NaBr + RbF | 63:34:3 | 63 | 3 | 0 |
| Ex. 124 | LiCl + NaBr + CsF | 63:34:3 | 63 | 3 | 0 |
| Ex. 125 | LiCl + KF + KCl | 63:3:34 | 63 | 3 | 0 |
| Ex. 126 | LiCl + KF + KBr | 63:2:35 | 63 | 2 | 0 |
| Ex. 127 | LiCl + KCl + CsF | 62:37:1 | 62 | 1 | 0 |
| Ex. 128 | LiBr + RbF + KCl | 62:2:36 | 62 | 2 | 0 |
| Ex. 129 | LiBr + NaF + KCl | 69:2:29 | 69 | 2 | 0 |
| Ex. 130 | LiBr + NaCl + KF | 78:13:8 | 78 | 8 | 0 |
| Ex. 131 | LiBr + KF + NaBr | 81:12:7 | 81 | 12 | 0 |
| Ex. 132 | LiBr + CsF + KCl | 69:2:29 | 69 | 2 | 0 |
| Ex. 133 | LiCl + NaF + KCl + NaCl | 53:2:35:10 | 53 | 2 | 0 |
| Ex. 134 | LiCl + NaF + KCl + KF | 69:2:24:5 | 69 | 7 | 0 |

TABLE 11

|  | Types of Salts | Mixing Ratio of Salts (molar ratio) | Li-ion Prop. (mol %) | F-ion Prop. (mol %) | I-ion Prop. (mol %) |
| --- | --- | --- | --- | --- | --- |
| Ex. 135 | LiBr + NaF + KCl + KF | 81:2:7:10 | 81 | 12 | 0 |
| Ex. 136 | LiBr + NaF + KCl + NaCl | 74:6:10:10 | 74 | 6 | 0 |
| Ex. 137 | LiBr + KF + NaF + NaCl | 80:8:2:10 | 80 | 10 | 0 |
| Ex. 138 | LiCl + KCl + NaF + KF + KBr | 71:18:1:5:5 | 71 | 6 | 0 |
| Ex. 139 | LiBr + KF + NaF + NaCl + NaBr | 79:10:2:4:5 | 79 | 12 | 0 |
| Ex. 140 | LiF + LiCl + LiBr + LiI | 18:22:50:10 | 100 | 18 | 10 |
| Ex. 141 | LiF + LiCl + LiBr + LiI | 15:21:44:20 | 100 | 15 | 20 |
| Ex. 142 | LiF + LiCl + LiI + NaBr | 5:44:20:31 | 69 | 5 | 20 |
| Ex. 143 | LiF + LiBr + LiI + NaF | 7:66:20:7 | 93 | 14 | 20 |
| Ex. 144 | LiF + LiBr + LiI + NaCl | 9:61:10:20 | 80 | 9 | 10 |
| Ex. 145 | LiF + LiBr + LiI + NaCl | 6:49:20:25 | 75 | 6 | 20 |
| Ex. 146 | LiF + LiBr + LiI + NaBr | 16:63:11:10 | 90 | 16 | 11 |
| Ex. 147 | LiF + LiBr + LiI + NaBr | 12:55:20:13 | 87 | 12 | 20 |
| Ex. 148 | LiCl + LiBr + LiI + NaF | 21:57:10:12 | 88 | 12 | 10 |
| Ex. 149 | LiCl + LiBr + LiI + NaF | 21:48:20:11 | 89 | 11 | 20 |
| Ex. 150 | LiCl + LiBr + LiI + NaBr | 36:22:10:32 | 68 | 0 | 10 |
| Ex. 151 | LiCl + LiBr + LiI + NaBr | 30:18:20:32 | 68 | 0 | 20 |
| Ex. 152 | LiCl + LiBr + LiI + KF | 20:59:10:11 | 89 | 11 | 10 |
| Ex. 153 | LiCl + LiBr + LiI + KF | 20:50:20:10 | 90 | 10 | 20 |
| Ex. 154 | LiBr + LiI + CsF | 82:6:12 | 88 | 12 | 6 |
| Ex. 155 | LiBr + KI + NaCl | 70:4:26 | 70 | 0 | 4 |

TABLE 12

|  | Melting Point (° C.) | Electric Conductivity at 500° C. (S/cm) | DC-IR at 500° C. (mΩ) | DC-IR at 430° C. (mΩ) |
| --- | --- | --- | --- | --- |
| Ex. 135 | 425 | 2.7 | 87 | 98 |
| Ex. 136 | 400 | 2.5 | 92 | 103 |
| Ex. 137 | 425 | 2.8 | 85 | 96 |
| Ex. 138 | 425 | 3.0 | 78 | 89 |
| Ex. 139 | 425 | 2.7 | 87 | 97 |
| Ex. 140 | 420 | 3.7 | 61 | 72 |
| Ex. 141 | 402 | 3.4 | 68 | 78 |
| Ex. 142 | 385 | 2.3 | 98 | 108 |
| Ex. 143 | 430 | 3.0 | 78 | 92 |
| Ex. 144 | 390 | 2.8 | 84 | 95 |
| Ex. 145 | 375 | 2.4 | 95 | 105 |
| Ex. 146 | 430 | 3.2 | 74 | 85 |
| Ex. 147 | 420 | 2.8 | 83 | 94 |
| Ex. 148 | 400 | 3.0 | 79 | 90 |
| Ex. 149 | 400 | 2.9 | 83 | 94 |
| Ex. 150 | 405 | 2.3 | 98 | 109 |
| Ex. 151 | 390 | 2.2 | 100 | 112 |
| Ex. 152 | 400 | 2.9 | 82 | 92 |
| Ex. 153 | 400 | 2.8 | 85 | 96 |
| Ex. 154 | 410 | 2.8 | 84 | 95 |
| Ex. 155 | 425 | 2.4 | 96 | 106 |

As shown in Tables 4, 6, 8, 10, and 12, DC-IR at 500° C. of the unit cells of Examples 7 to 155 was 60 to 100 mΩ. These values were about 7 to 44% lower than the DC-IR value (108 mΩ) of a common thermal battery containing a LiCl—KCl molten salt.

DC-IR at 430° C. of the unit cells of Examples 7 to 155 was 69 to 112 mΩ. These values were about 5 to 41% lower than the DC-IR value at 430° C. (118 mΩ) of a common thermal battery containing a LiCl—KCl molten salt.

The electric conductivity of the molten salt of the present invention is high, and therefore its ion conductivity is high. Furthermore, its melting point is 430° C. or less. Thus, the molten salt of the present invention does not reach a solidified state even at 430° C., and can keep high ion conductivity. As a result, the discharge performance of the thermal batteries was improved more than the discharge performance of conventional thermal batteries even when the temperature in the battery became 430° C. or less probably because of the use of the molten salt of the present invention.

As described above, in the present invention, the types of salts and their mixing ratios were adjusted so that the melting point of the molten salt was 350° C. or more and 430° C. or less, and that the electric conductivity at 500° C. was 2.2 S/cm or more. It is clear that such adjustment can achieve an improved battery output performance under a wide temperature range, i.e., from a normal temperature environment (battery internal temperature setting of about 500° C.) to an extreme low temperature environment of −50° C. (estimated battery internal temperature of 430° C.).

Furthermore, it seems that the molten salt of the present invention probably has chemical stability of the same level as that of the conventionally and commonly used LiCl—KCl molten salt, since the amount of fluorine anion and/or the amount of iodine anion are suitably adjusted when the molten salt includes fluorine anion and/or iodine anion.

In the following examples, a thermal battery as shown in FIG. 1 was made.

Example 156

A thermal battery as shown in FIG. 1 was made by using the unit cell made in Example 1. The fabrication of the thermal battery was carried out in dry air with a dew point of −50° C. or less to eliminate the effects from moisture as much as possible.

Unit cells 7 and heating agents 5 were stacked alternately to form a power-generating portion. The number of the unit cells 7 used was 13. For the heating agent 5, a mixture of Fe and $KClO_4$ were used. The amount of the heating agent was adjusted so that the average temperature during battery operation was 500° C.

An ignition pad 4 was disposed on top of the power-generating portion, and around the power-generating portion was covered with a fuse wrap 6. For the ignition pad 4 and the fuse wrap 6, a mixture of Zr, $BaCrO_4$, and glass fiber was used.

For an igniting agent of an ignition plug 3, a mixture of potassium nitrate, sulfur, and carbon was used. For insulating materials 9a and 9b, a ceramic fiber material mainly composed of silica and alumina was used.

Example 157

A thermal battery of Example 157 was made in the same manner as Example 156, except that the unit cell of Example 17 was used instead of the unit cell of Example 1.

Example 158

A thermal battery of Example 158 was made in the same manner as Example 156, except that the unit cell of Example 26 was used instead of the unit cell of Example 1.

Example 159

A thermal battery of Example 159 was made in the same manner as Example 156, except that the unit cell of Example 80 was used instead of the unit cell of Example 1.

Example 160

A thermal battery of Example 160 was made in the same manner as Example 156, except that the unit cell of Example 90 was used instead of the unit cell of Example 1.

Example 161

A thermal battery of Example 161 was made in the same manner as Example 156, except that the unit cell of Example 104 was used instead of the unit cell of Example 1.

Example 162

A thermal battery of Example 162 was made in the same manner as Example 156, except that the unit cell of Example 131 was used instead of the unit cell of Example 1.

Example 163

A thermal battery of Example 163 was made in the same manner as Example 156, except that the unit cell of Example 141 was used instead of the unit cell of Example 1.

Example 164

A thermal battery of Example 164 was made in the same manner as Example 156, except that the unit cell of Example 146 was used instead of the unit cell of Example 1.

Example 165

A thermal battery of Example 165 was made in the same manner as Example 156, except that the unit cell of Example 149 was used instead of the unit cell of Example 1.

Example 166

A thermal battery of Example 166 was made in the same manner as Example 156, except that the unit cell of Example 154 was used instead of the unit cell of Example 1.

The following discharge test was conducted for the thermal batteries of Examples 156 to 166. That is, a high voltage was applied from a power source connected to the ignition terminal to ignite the ignition plug, thereby activating the thermal battery. Then, the thermal battery was discharged at a current density of 1 A/cm$^2$ (end voltage: 6.5 V). This discharge test was carried out by placing the thermal battery in a temperature-controllable temperature bath, setting the environment temperature to 20° C. (normal temperature) or −50° C. (extreme low temperature).

As a result, it was confirmed that the thermal batteries in which a plurality of the unit cells were stacked could achieve the DC-IR value same as that of the unit cell as well.

In many cases, thermal batteries are required to have a high electric current and further a high voltage. Thus, as shown in FIG. 1, a common thermal battery has a power-generating portion in which a plurality of the unit cells and a plurality of the heating agents are stacked alternately. The performance of a thermal battery is heavily dependent on its unit cell performance, as described above. That is, in the present invention, with improved unit cell performance, a high performance thermal battery can be obtained regardless of the number of the unit cells to be stacked.

For example, when the operation temperature of a thermal battery is set to 450° C., based on the low operating temperature, the amount of the heating agent can be decreased compared with the case where the operating temperature of the thermal battery is set to 500° C. and 550° C. Thus, the thermal battery can also be made small and lightweight.

Although the shape of the electrolyte layer was a disk with a diameter of 13 mm in the above-described examples, the size and shape of the electrolyte layer are not particularly limited. The shape of the electrolyte layer may be, for example, donut shape with a hole in its center, semi-circle, and rectangle.

With the present invention, a molten salt with an electric conductivity higher than those of conventional molten salts, especially a molten salt suitable for an electrolyte of thermal batteries can be provided. Therefore, with the present invention, a battery with output performance more excellent than those of conventional batteries, or a small and lightweight thermal battery with excellent output performance can be provided. Additionally, with the present invention, chemical stability of molten salts can be improved, which has been difficult or impossible in conventional techniques.

Although the invention has been described in terms of the presently preferred embodiments, it is to be understood that such disclosure is not to be interpreted as limiting. Various alterations and modifications will no doubt become apparent to those skilled in the art to which the invention pertains, after having read the above disclosure. Accordingly, it is intended that the appended claims be interpreted as covering all alterations and modifications as fall within the true spirit and scope of the invention.

The invention claimed is:

1. A molten salt comprising at least a first salt and a second salt, said molten salt having a melting point of 350° C. or more and 430° C. or less, and an electric conductivity at 500° C. of 2.2 S/cm or more,
   wherein said molten salt comprises at least a first salt and a second salt,
   said first salt includes LiF and LiBr, and
   said second salt includes at least one salt selected from the group consisting of NaF, NaCl, NaBr, KF, KCl, RbF, and CsF.

2. The molten salt in accordance with claim 1, wherein an amount of lithium cation relative to a total amount of cation included in said molten salt is 50 mol % or more.

3. The molten salt in accordance with claim 1, wherein an amount of fluorine anion relative to a total amount of anion included in said molten salt is 20 mol % or less.

4. A thermal battery comprising at least one unit cell including a positive electrode, a negative electrode, and an electrolyte disposed between said positive electrode and said negative electrode,
   wherein said electrolyte includes the molten salt in accordance with claim 1.

5. The thermal battery in accordance with claim 4, wherein said negative electrode further includes said molten salt.

6. The thermal battery in accordance with claim 4, wherein, said molten salt included in at least one of said positive electrode and said negative electrode is the same as said molten salt included in said electrolyte.

7. The thermal battery in accordance with claim 4, wherein said positive electrode comprises a positive electrode active material selected from the group consisting of manganese oxides, vanadium oxides, molybdenum oxides, lithium-containing oxides, and sulfides.

* * * * *